US012806559B2

(12) United States Patent
Long et al.

(10) Patent No.: US 12,806,559 B2
(45) Date of Patent: Nov. 24, 2026

(54) METHODS USING LIGAND INSERTION MECHANISM FOR AMMONIA CAPTURE AND STORAGE IN METAL-ORGANIC FRAMEWORKS

(71) Applicant: THE REGENTS OF THE UNIVERSITY OF CALIFORNIA, Oakland, CA (US)

(72) Inventors: Jeffrey R. Long, Berkeley, CA (US); Benjamin E. R. Snyder, Champaign, IL (US); Ari B. Turkiewicz, Berkeley, CA (US); Hiroyasu Furukawa, Berkeley, CA (US); Maria V. Paley, Berkeley, CA (US); Ever O. Velasquez, Berkeley, CA (US); Matthew N. Dods, Berkeley, CA (US)

(73) Assignee: THE REGENTS OF THE UNIVERSITY OF CALIFORNIA, Oakland, CA (US)

( * ) Notice: Subject to any disclaimer, the term of this patent is extended or adjusted under 35 U.S.C. 154(b) by 295 days.

(21) Appl. No.: 18/434,724

(22) Filed: Feb. 6, 2024

(65) Prior Publication Data

US 2024/0261720 A1 Aug. 8, 2024

Related U.S. Application Data

(60) Provisional application No. 63/483,555, filed on Feb. 7, 2023.

(51) Int. Cl.
*B01D 53/02* (2006.01)
*B01D 53/04* (2006.01)
(Continued)

(52) U.S. Cl.
CPC ........ *B01D 53/0462* (2013.01); *B01J 20/226* (2013.01); *C01C 1/024* (2013.01);
(Continued)

(58) Field of Classification Search
CPC ........ B01D 2253/204; B01D 2257/406; B01D 53/02; B01D 53/0462; B01J 20/226;
(Continued)

(56) References Cited

U.S. PATENT DOCUMENTS 7,637,983 B1 * 12/2009 Liu .................... B01J 20/28026 95/55
10,035,127 B2 * 7/2018 Long ....................... C07C 65/03
(Continued)

OTHER PUBLICATIONS

Qing, Geletu, et al., "Recent Advances and Challenges of Electrocatalytic N2 Reduction to Ammonia", Chemical Reviews, vol. 120, Issue 12, May 27, 2020, pp. 5437-5516.
(Continued)

*Primary Examiner* — Christopher P Jones
(74) *Attorney, Agent, or Firm* — O'BANION & RITCHEY LLP; John P. O'Banion

(57) ABSTRACT

A porous metal-organic framework M(dicarboxylate), where M=a divalent transition metal ion or alkaline earth metal ion, and (dicarboxylate)=a dicarboxylate linker with a layered two-dimensional structure with paddlewheel-type metal nodes forming a three-dimensional structure with rhombic channels along a c axis. The M(dicarboxylate) family of frameworks, where M=Cu, Fe, Cr, Mg, Ca, Mn, Co, Ni, Zn, Mo or Cd and (dicarboxylate)=trans-1,4-cyclohexanedicarboxylate, 1,4-benzenedicarboxylate, 4,4'-biphenyldicarboxylate, or 2,3,5,6-tetrafluorobenzenedicarboxylate, reversibly binds ammonia via cooperative insertion into its metal-carboxylate bonds to form a dense, one-dimensional coordination polymer that has rapid adsorption kinetics, a comparatively large working capacity and minimal expansion upon ammonia capture.

20 Claims, 9 Drawing Sheets

Cu(cyhdc)

(51) Int. Cl.

| | |
|---|---|
| ***B01J 20/22*** | (2006.01) |
| ***C01C 1/02*** | (2006.01) |
| ***C07F 1/08*** | (2006.01) |
| ***C07F 11/00*** | (2006.01) |
| ***C07F 15/02*** | (2006.01) |

(52) U.S. Cl.
CPC .............. *C07F 1/08* (2013.01); *C07F 11/005* (2013.01); *C07F 15/025* (2013.01); *B01D 2253/204* (2013.01); *B01D 2257/406* (2013.01)

(58) Field of Classification Search
CPC .......... C01C 1/024; C07F 1/08; C07F 11/005; C07F 15/025; C07F 3/003; C07F 3/06
See application file for complete search history.

(56) References Cited

U.S. PATENT DOCUMENTS

2004/0225134 A1* 11/2004 Yaghi ...................... C07F 3/003 549/211
2010/0132359 A1* 6/2010 Minhas ................ B01J 20/3204 60/645
2011/0253205 A1* 10/2011 Grossman ............. H10K 30/30 977/948
2012/0172612 A1* 7/2012 Yaghi ..................... B01J 20/226 556/132
2020/0129971 A1* 4/2020 Zhao ....................... C02F 1/705
2022/0023829 A1* 1/2022 Ozdemir ............ B01J 20/28083

OTHER PUBLICATIONS

Guo, Jianping, et al., "Catalyst: NH3 as an Energy Carrier", Chem , vol. 3, Nov. 9, 2017, pp. 709-712.
Ye, Tian-Nan, et al., "Vacancy-enabled N2 activation for ammonia synthesis on an Ni-loaded catalyst", Nature, vol. 583, Jul. 15, 2020, pp. 391-395.
Li, Katja, et al., "Enhancement of lithium-mediated ammonia synthesis by addition of oxygen", Science, vol. 374, Issue 6575, Dec. 23, 2021, pp. 1593-1597.
Suruanto, Bryan H.R., et al., "Nitrogen reduction to ammonia at high efficiency and rates based on a phosphonium proton shuttle", Science, vol. 372, No. 6547, Jun. 11, 2021, pp. 1187-1191.
Soloveichik, Grigorii, "Electrochemical synthesis of ammonia as a potential alternative to the Haber-Bosch process", Nature Catalysis, vol. 2, May 13, 2019, pp. 377-380.
Smith, Colin, et al., "Current and future role of Haber-Bosch ammonia in a carbon-free energy landscape", Energy Environmental Science, vol. 13, 2020, pp. 331-344.
Malmali, Mahdi, et al., "Better Absorbents for Ammonia Separation", ACS Sustainable Chemistry &. Engineering, vol. 6, 2018, pp. 6536-6546.
Smith, Colin, et al., "Optimizing the Conditions for Ammonia Production Using Absorption", ACS Sustainainable Chemistry & Engineering, vol. 7, 2019, pp. 4019-4029.
Rieth, Adam J., et al., "Kinetic stability of metal-organic frameworks for corrosive and coordinating gas capture", Nature Reviews Materials, vol. 4, 2019, pp. 708-725.
Kajiwara, Takashi, et al., "A Systematic Study on the Stability of Porous Coordination Polymers against Ammonia", Chemistry—A European Journal, vol. 20, 2014, pp. 15611-15617.
Mason, Jarad, et al., "Methane storage in flexible metal-organic frameworks with instrinsic thermal management", Nature, vol. 527, Nov. 19, 2015, pp. 357-371.
Godfrey, Harry G., et al., "Ammonia Storage by Reversible Host-Guest Site Exchange in a Robust Metal-Organic Framework", Angewandte Chemie Int. Ed. , vol. 57, 2018, pp. 14778-14781.
Chen, Yang, et al., "Removal of Ammonia Emissions via Reversible Structural Transformation in M(BDC) (M=Cu, Zn, Cd) Metal-Organic Frameworks", Environment Science Technology, vol. 54, 2020, pp. 3636-3642.
Chen, Yang, et al., "Environmentally friendly synthesis of flexible MOFs M(NA)2 (M=Zn, Co, Cu, Cd) with large and regenerable ammonia capacity", Journal of Materials Chemistry A, vol. 6, 2018, pp. 9922-9929.
Chen, Yang, "Ammonia capture and flexible transformation of M-2 (INA)(M=Cu, Co, Ni, Cd) series materials", Journal of Hazardous Materials, vol. 306, 2016, pp. 340-347.
Lyu, Pengbo, et al., "Ammonia Capture via an Unconventional Reversible Guest-Induced Metal-Linker Bond Dynamics in a Highly Stable Metal-Organic Framework", Chemistry of Materials, vol. 33, 2021, pp. 6186-6192.
Kumagai, Hitoshi, et al., "Metal-Organic Frameworks from Copper Dimers with cis- and trans-1,4- Cyclohexanedicarboxylate and cis, cis-1,3,5-Cyclohexanetricarboxylate", Inorganic Chemistry, vol. 46, 2007, pp. 5949-5956.
Seki, Kenji, et al., "Characterization of Microporous Copper(II) Dicarboxylates (Fumarate, Terephthalate, and trans-1,4-Cyclohexanedicarboxylate) by Gas Adsorption", Chemistry Letters, vol. 30, 2001, pp. 122-123.
Kim, Dae Won, et al., "High Ammonia Uptake of a Metal-Organic Framework Adsorbent in a Wide Pressure Range", Angewandte Chemie International Edition, vol. 59, 2020, pp. 22531-22536.
Mcdonald, Thomas M., et al., "Cooperative insertion of CO2 in diamine-appended metal-organic frameworks", Nature, vol. 519, 2015, pp. 303-308.
Reed, Douglas A., et al., "A spin transition mechanism for cooperative adsorption in metal-organic frameworks" Nature, vol. 550, 2017, pp. 96-100.
Liu, Chun, et al., "Ammonia Absorption on Alkaline Earth Halides as Ammonia Separation and Storage Procedure", Bulletin of The Chemical Society of Japan, 2004, vol. 77, pp. 123-131.
Kang, Dong Won, et al., "A Hydrogen-Bonded Organic Framework (HOF) with Type IV NH3 Adsorption Behavior", Angewandte Chemie, vol. 131, 2019, pp. 16298-16301.
Chen, Yang, et al., "Antenna-protected metal-organic squares for water/ammonia uptake with excellent stability and regenerability", ACS Sustainable Chemistry & Engineering, vol. 5, 2017, pp. 5082-5089.
Steiner, Thomas, "The Hydrogen Bond in the Solid State", Angewandte Chemie International Edition, 2002, pp. 41, 48-76.
Wang, Liying Li, et al., "The adsorption refrigeration characteristics of alkaline-earth metal chlorides and its composite adsorbents", Renewable Energy, vol. 34, 2009, pp. 1016-1023.
Wang, L. W., et al., "Comparison of the adsorption performance of compound adsorbent in a refrigeration cycle with and without mass recovery", Chemical Engineering Science, vol. 61, 2006, pp. 3761-3770.
Rieth, Adam J., et al., "High and Reversible Ammonia Uptake in Mesoporous Azolate Metal-Organic Frameworks with Open Mn, Co, and Ni Sites", Journal of the American Chemical Society, Issue 138, 2016, pp. 9401-9404.
Katz, Michael J., et al., "High volumetric uptake of ammonia using Cu-MOF-74/Cu-CPO-27", Dalton Transactions, vol. 45, pp. 4150-4153.
Hiraide, Shotaro, et al., "Intrinsic thermal management capabilities of flexible metal-organic frameworks for carbon dioxide separation and capture", ACS Applied Materials & Interfaces, vol. 9, 2017, pp. 41066-41077.
Feldmann, Wesley K., et al., "Pressure-Gradient Sorption Calorimetry of Flexible Porous Materials: Implications for Intrinsic Thermal Management", ChemSusChem, Communications, vol. 13, 2020, pp. 5220-5223.
An, Guoliang, et al., "Metal-Organic Frameworks for Ammonia-Based Thermal Energy Storage", Nano-Micro-Small, vol. 17, 2021, pp. 1-11.
Liu, Zhilu, et al., "The potential use of metal-organic framework/ammonia working pairs in adsorption chillers", Journal of Materials Chemistry A, Issue 10, 2021, pp. 6188-6195.
Kale, Matthew J., et al., "Optimizing ammonia separation via reactive absorption for sustainable ammonia synthesis", ACS Applied Energy Materials, vol. 3, 2020, pp. 2576-2584.

(56) References Cited

OTHER PUBLICATIONS

Hrtus, D. J., N, "Achieving+ 95% Ammonia Purity by Optimizing the Absorption and Desorption Conditions of Supported Metal Halides", ACS Sustainable Chemistry & Engineering, vol. 10, 2021, pp. 204-212.
Irving, H., et al., "637. The stability of transition-metal complexes", Journal of the Chemical Society, 1953, pp. 3192-3210.
Paoletti, Piero, "Formation of metal complexes with ethylenediamine: a critical survey of equilibrium constants, enthalpy and entropy values", Pure Appl. Chem., vol. 56, No. 4, 1984, pp. 491-522.
Jiang, L.ong, et al., "Thermal conductivity, permeability and reaction characteristic enhancement of ammonia solid sorbents: A review", International Journal of Heat Mass Transfer, vol. 130, 2019, pp. 1206-1225.
Sheldrick, George M., "SHELXT—Integrated space-group and crystal-structure determination", Acta Cryst, vol. 71, 2015, pp. 3-8.
Sheldrick, George M., "SHELXT: Integrating Space Group Determination and Structure Solution", Bruker/MIT Symposium 2014, 1 page.
Sheldrick, G. M. et al., "A short history of SHELXT", Foundations Advances., vol. 64, Part 1, Jan. 2008, pp. 112-122.
Dolomanov, Oleg V., et al., "OLEX2: a complete structure solution, refinement and analysis program", Journal of Applied Crystallography, vol. 42, 2009, pp. 339-341.
Carson, Cantwell G., et al., "Structure Solution from Powder Diffraction of Copper1, 4-Benzenedicarboxylate", European Journal of Inorganic Chemistry, vol. 2014, Issue 12, Mar. 13, 2014, pp. 2140-2145.
Synyder, Benjamin E. R., et al., "A ligand insertion mechanism for cooperative NH3 capture in metal-organic frameworks", Nature, vol. 613, Jan. 12, 2023, pp. 287-296.

* cited by examiner

METHODS USING LIGAND INSERTION MECHANISM FOR AMMONIA CAPTURE AND STORAGE IN METAL-ORGANIC FRAMEWORKS

CROSS-REFERENCE TO RELATED APPLICATIONS

This application claims priority to, and the benefit of, U.S. provisional patent application Ser. No. 63/483,555 filed on Feb. 7, 2023, incorporated herein by reference in its entirety.

STATEMENT REGARDING FEDERALLY SPONSORED RESEARCH OR DEVELOPMENT

This invention was made with Government support under DE-SC0019992 and DE-AC02-06CH11357, awarded by the U.S. Department of Energy; and under OD023532, awarded by the National Institutes of Health. The Government has certain rights in the invention.

NOTICE OF MATERIAL SUBJECT TO COPYRIGHT PROTECTION

A portion of the material in this patent document may be subject to copyright protection under the copyright laws of the United States and of other countries. The owner of the copyright rights has no objection to the facsimile reproduction by anyone of the patent document or the patent disclosure, as it appears in the United States Patent and Trademark Office publicly available file or records, but otherwise reserves all copyright rights whatsoever. The copyright owner does not hereby waive any of its rights to have this patent document maintained in secrecy, including without limitation its rights pursuant to 37 C.F.R. § 1.14.

BACKGROUND

1. Technical Field

This technology pertains generally to methods and compositions for ammonia gas separations and capture and more particularly to a tunable three-dimensional framework family that reversibly binds ammonia via cooperative insertion into its metal-carboxylate bonds to form a dense, one-dimensional coordination polymer that has rapid adsorption kinetics, a comparatively large working capacity and minimal expansion upon ammonia capture.

2. Background Discussion

Ammonia is a critical chemical in agriculture and industry that is typically produced on a massive scale via the Haber-Bosch process. The environmental impact of this process, which uses methane as a fuel and feedstock for $H_2$, has motivated the need for more sustainable ammonia production. However, many strategies that use renewable $H_2$ are not compatible with existing methods for ammonia separation. Given their high surface areas and structural and chemical versatility, metal-organic frameworks (MOFs) are promising materials for ammonia separations, but most MOFs bind ammonia irreversibly or degrade upon exposure to this corrosive gas.

The development of new methods for $NH_3$ separation that could replace refrigeration-condensation have been identified as a critical step in the realization of more efficient, sustainable, and decentralized ammonia production. Metal halides dispersed in solid supports have garnered interest for this purpose, as they can operate effectively at relatively low pressures and high temperatures and exhibit ammonia capacities that exceed those of activated carbons and zeolites. Porous, tunable MOFs have also been studied for $NH_3$ capture, largely in the context of storage, public health and safety. However, examples that are stable to ammonia remain scarce, particularly under cyclical exposure. Frameworks featuring robust metal-linker bonds and coordinatively-unsaturated metal sites capable of strongly binding $NH_3$ offer some advantages, although the large enthalpies associated with ammonia binding at open metal sites and typical Langmuir-type adsorption behavior are not ideal for practical applications.

In recent years, several metal-carboxylate frameworks featuring coordinatively saturated metal sites have been reported to possess large regenerable ammonia capacities that, in many cases, greatly exceed the predicted capacities based on a physisorptive pore-filling adsorption mechanism. Based on spectroscopic and/or gravimetric analysis, it has been proposed that ammonia uptake in these materials occurs via chemisorption following the disruption of the metal-carboxylate bonds. In the case of Cu(bdc) ($bdc^{2-}$=1,4-benzenedicarboxylate), the formation of a one-dimensional coordination polymer $Cu(bdc)(NH_3)_2$ was proposed based on powder x-ray diffraction data, although this structure was not reconciled with measured ammonia uptake in the material. While harnessing reversible adsorbate insertion in MOFs is an attractive strategy for the design of robust ammonia adsorbents, this phenomenon has yet to be conclusively demonstrated and controlled.

BRIEF SUMMARY

Methods and compositions are provided that are particularly suited for ammonia separations and capture. The compositions are a family of frameworks formulated as M(dicarboxylate), where $(dicarboxylate)^{2-}$ is an approximately linear dicarboxylate linker leading to the same overall framework topology as Cu(cyhdc). The approximately linear dicarboxylate linker may also include bent dicarboxylate linkers. These are known to result in different framework topologies, while still having layered two-dimensional structures with paddlewheel-type metal nodes, with the potential to engage in adsorption by cooperative ligand insertion.

In one embodiment, a tunable three-dimensional framework configured to reversibly bind Lewis-base gases by a cooperative insertion into metal-carboxylate bonds to form a dense, one-dimensional coordination polymer is provided. The framework comprises M(dicarboxylate), where M=Cu, Fe, Cr, Mg, Ca, Mn, Co, Ni, Zn, Mo or Cd and (dicarboxylate)=trans-1,4-cyclohexanedicarboxylate, 1,4-benzenedicarboxylate, 4,4'-biphenyldicarboxylate, or 2,3,5,6-tetrafluorobenzenedicarboxylate.

In another embodiment, the porous metal-organic framework is formed with metal ions comprising combinations of two or more metal types distributed throughout the framework in selected ratios.

While gaseous $NH_3$ is the main separation target, the adsorption mechanism described here could in principle be used to separate other Lewis-basic gases. Other amines (e.g. alkylamines) are potential targets, along with phosphines, and alcohols. This adsorption mechanism could also be used for liquid-phase separations involving Lewis-basic adsorbates.

In another embodiment, a method for gas separations is provided by preparing a porous metal organic framework M(dicarboxylate); contacting the framework with a stream or mixture of gases containing a target Lewis-basic gas and adsorbing the target gases to the porous metal organic framework. The adsorbed molecules can be released from the framework and the adsorption and desorption temperatures as well as pressure conditions can be optimized.

The group of compositions and methods are illustrated with a detailed study of ammonia uptake in the crystalline, air-stable framework Cu(cyhdc) ($cyhdc^{2-}$=trans-1,4-cyclohexanedicarboxylate), which features coordinatively saturated copper(II) sites. Based on gas adsorption as well as single-crystal and powder x-ray diffraction data, ammonia adsorption in this material is shown to trigger reversible, temperature and pressure-dependent cooperative phase transitions. As a result, the Cu(cyhdc) material is highly selective for uptake of ammonia over $N_2$ and $H_2$. The threshold pressure for ammonia insertion can also be tuned by nearly five orders of magnitude through judicious choice of metal and linker within the Cu(cyhdc) structure type.

In sum, a family of tunable three-dimensional frameworks is provided that reversibly binds ammonia via cooperative insertion into its metal-carboxylate bonds to form a dense, one-dimensional coordination polymer. This unusual adsorption mechanism provides considerable intrinsic thermal management, and at high pressures and temperatures, cooperative ammonia uptake gives rise to large working capacities. Other key advantages include low cost, rapid adsorption kinetics, as well as minimal volume expansion upon $NH_3$ capture. Finally, the threshold pressure for ammonia adsorption can further be tuned by almost five orders of magnitude through simple synthetic modifications, pointing to a broader strategy for the development of energy-efficient ammonia adsorbents.

Further aspects of the technology described herein will be brought out in the following portions of the specification, wherein the detailed description is for the purpose of fully disclosing preferred embodiments of the technology without placing limitations thereon.

BRIEF DESCRIPTION OF THE DRAWINGS

The technology described herein will be more fully understood by reference to the following drawings which are for illustrative purposes only.

DETAILED DESCRIPTION

Referring more specifically to the drawings, for illustrative purposes, compositions, constructs and methods for ammonia separations and capture using a metal organic framework utilizing a cooperative insertion mechanism are generally shown. Several embodiments of the technology are described generally in FIG. 1 to FIG. 12 to illustrate the characteristics and functionality of the compositions, systems, materials and methods. It will be appreciated that the methods may vary as to the specific steps and sequence and the systems and apparatus may vary as to structural details without departing from the basic concepts as disclosed herein. The method steps are merely exemplary of the order that these steps may occur. The steps may occur in any order that is desired, such that it still performs the goals of the claimed technology.

Figure 1:
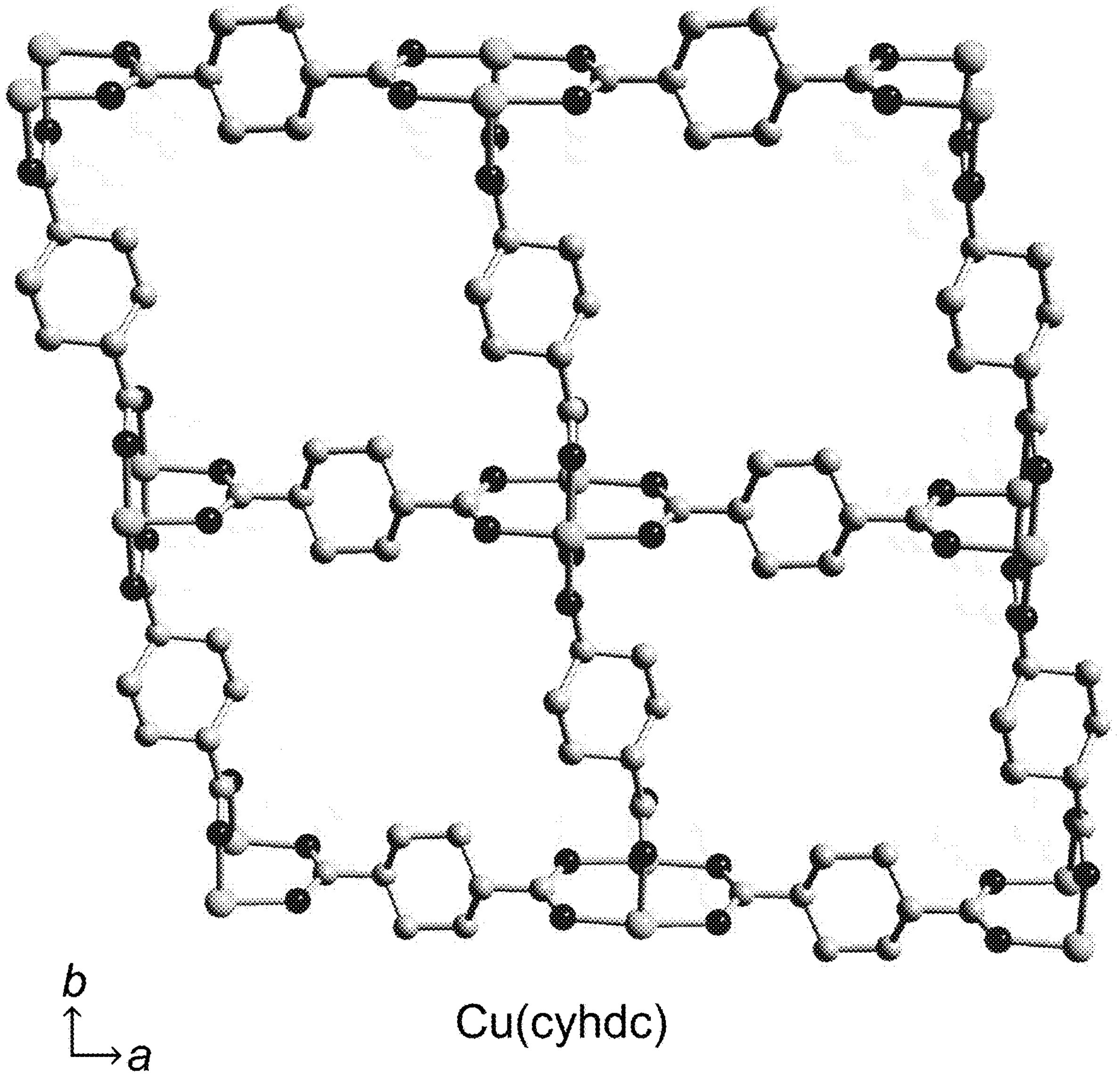
FIG. 1 is a schematic illustration of the crystal structure of the metal-organic framework Cu(cyhdc) showing the rhombic channels with vertices formed by copper-carboxylate "paddlewheel units" according to one embodiment of the technology.
Figure 2:
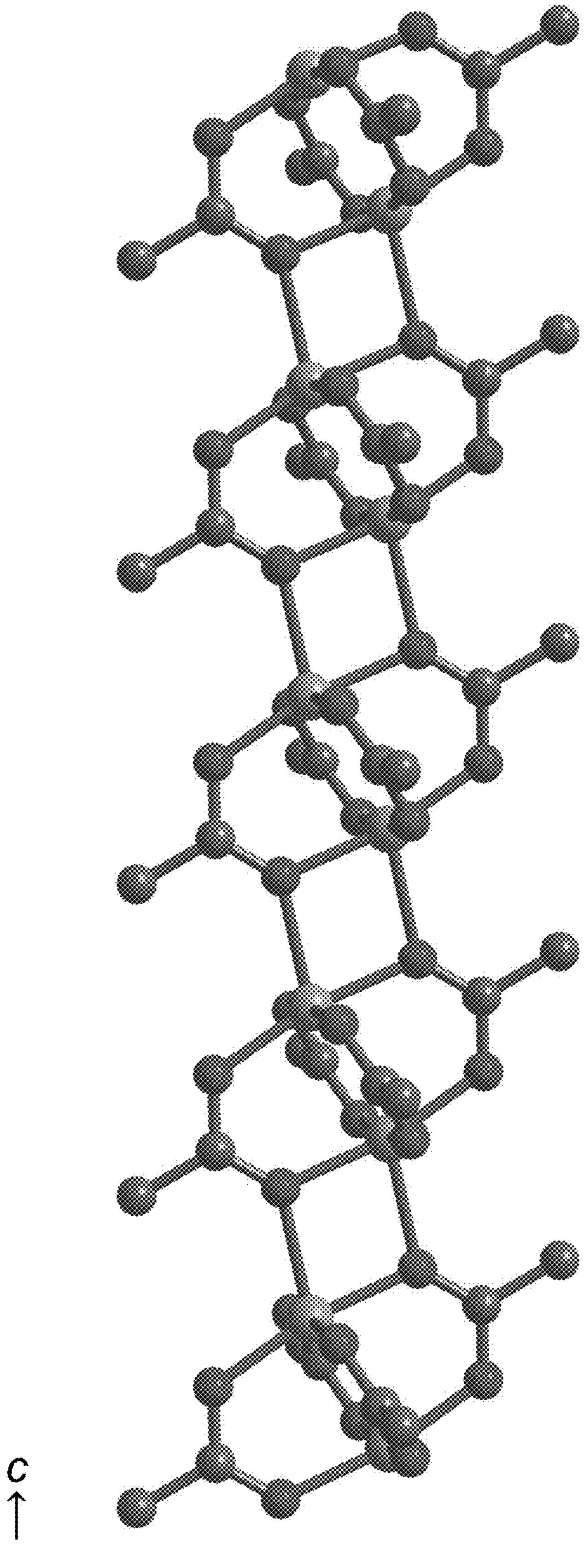
FIG. 2 is a schematic illustration of the crystal structure of a vertex of the framework shown in FIG. 1.

Turning now to FIG. 1, a family of porous metal-organic framework materials for ammonia and gas separations and capture is provided. The family of M(dicarboxylate) porous metal-organic frameworks, where M=a divalent transition metal ion or alkaline earth metal ion, and (dicarboxylate)=a dicarboxylate linker with a layered two-dimensional structure with paddlewheel-type metal nodes forming a three-dimensional structure with rhombic channels along a c axis is illustrated with the Cu(cyhdc) ($cyhdc^{2-}$-trans-1,4-cyclohexanedicarboxylate) framework, which features coordinatively saturated copper(II) sites.

Preferred linkers are selected from the group consisting of trans-1,4-cyclohexanedicarboxylate, 1,4-benzenedicarboxylate, 4,4'-biphenyldicarboxylate, and 2,3,5,6-tetrafluorobenzenedicarboxylate. Preferred metals M of the porous metal-organic framework are selected from the group consisting of Cu, Fe, Cr, Mg, Ca, Mn, Co, Ni, Zn, Mo and Cd.

The functional capabilities of the family of frameworks are illustrated with detailed demonstration of ammonia uptake in the crystalline, air-stable framework Cu(cyhdc) ($cyhdc^{2-}$=trans-1,4-cyclohexanedicarboxylate). Based on gas adsorption as well as single-crystal and powder x-ray diffraction data, ammonia adsorption in this material triggers reversible, temperature and pressure-dependent cooperative phase transitions, and as a result, Cu(cyhdc) is highly selective for uptake of ammonia over $N_2$ and $H_2$.

The threshold pressure for ammonia insertion can also be tuned by nearly five orders of magnitude through the judicious choice of metal and linker within the Cu(cyhdc) structure type. This provides concrete evidence for a guest-induced structural transformation driving selective ammonia capture in a MOF, with relevance to the design of phase-change adsorbents for ammonia capture and separations.

As seen in FIG. 1, the framework Cu(cyhdc) features one-dimensional chains of dicopper paddlewheel shaped units connected by ditopic trans-1,4-cyclohexanedicarboxylate linkers to form a three-dimensional structure with rhombic channels along the c axis. Each metal center features four equatorial carboxylate oxygens and a fifth axial carboxylate oxygen from a linker of a neighboring paddlewheel unit and shown in FIG. 2.

Figure 3:
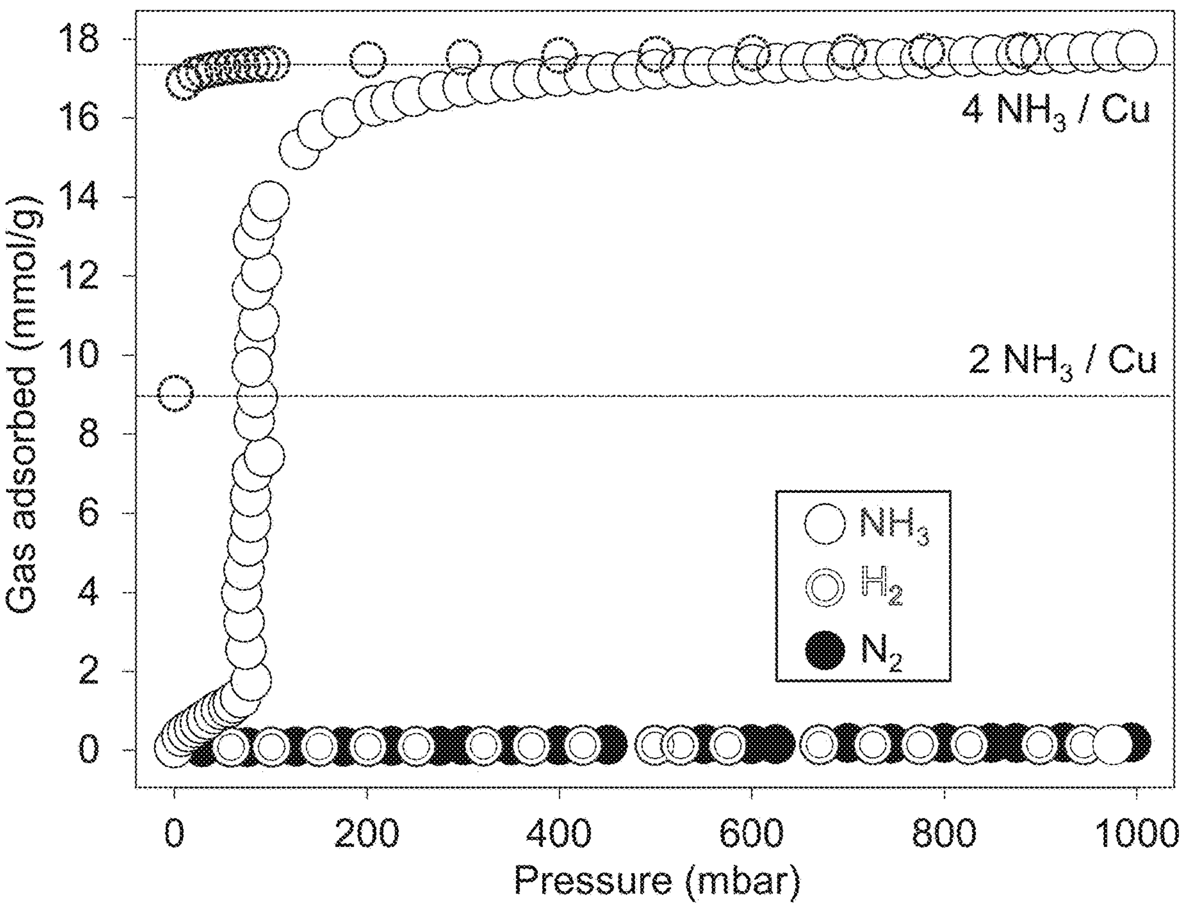
FIG. 3 is a plot of ammonia adsorption (open) and desorption (solid) isotherms obtained at 298 K for Cu(cyhdc) Nitrogen and $H_2$ adsorption isotherms are shown for comparison. Horizontal dashed lines indicate ammonia capacities associated with adsorption of two (lower) and four (upper) equivalents of ammonia per copper site, respectively.
Figure 4:
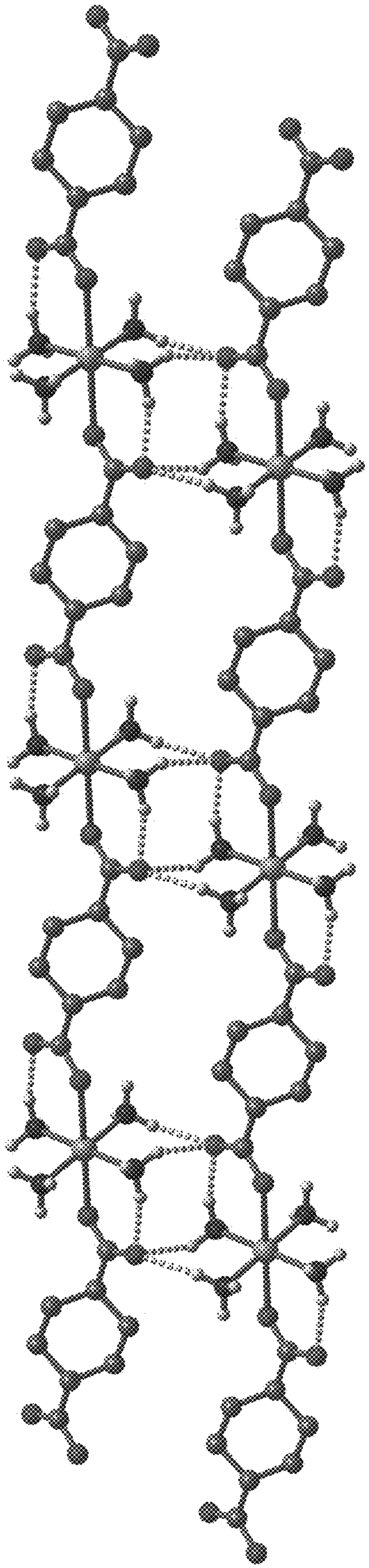
FIG. 4 is a schematic illustration of the structure of $Cu(NH_3)_4$(cyhdc) as obtained from single-crystal x-ray diffraction analysis, showing hydrogen bonding interactions between adjacent polymer chains. The local copper environment in $Cu(NH_3)_4$(cyhdc) and the coordination environment of the copper sites in $Cu(NH_3)_2$(cyhdc) were evaluated.
Figure 5:
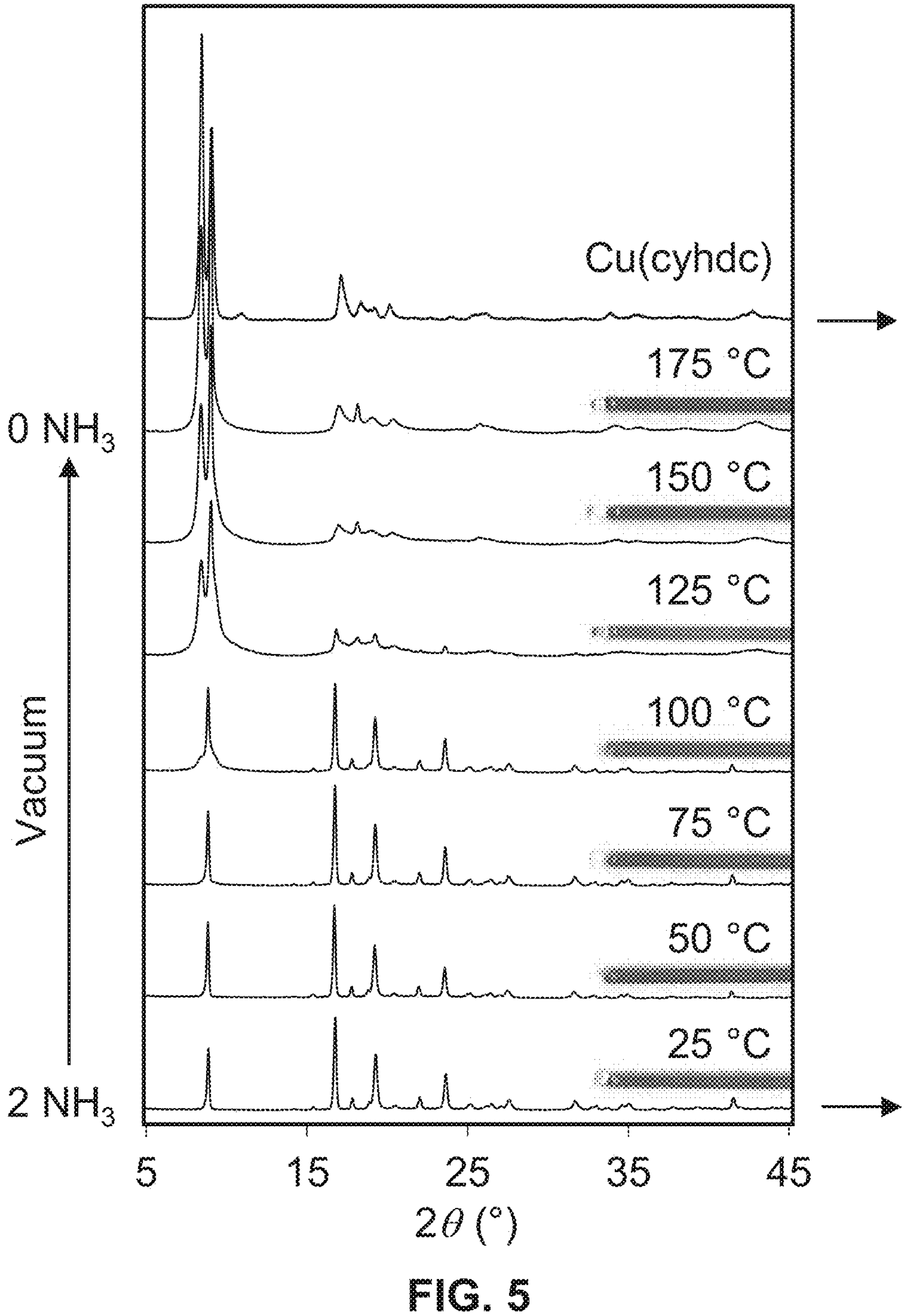
FIG. 5 is a plot of powder x-ray diffraction data collected while heating pristine $Cu(NH_3)_2$(cyhdc) (bottom) under dynamic vacuum to regenerate Cu(cyhdc) and progressively increasing temperatures. The diffraction pattern for pristine Cu(cyhdc) is shown for comparison at the top of the plot.
Figure 6:
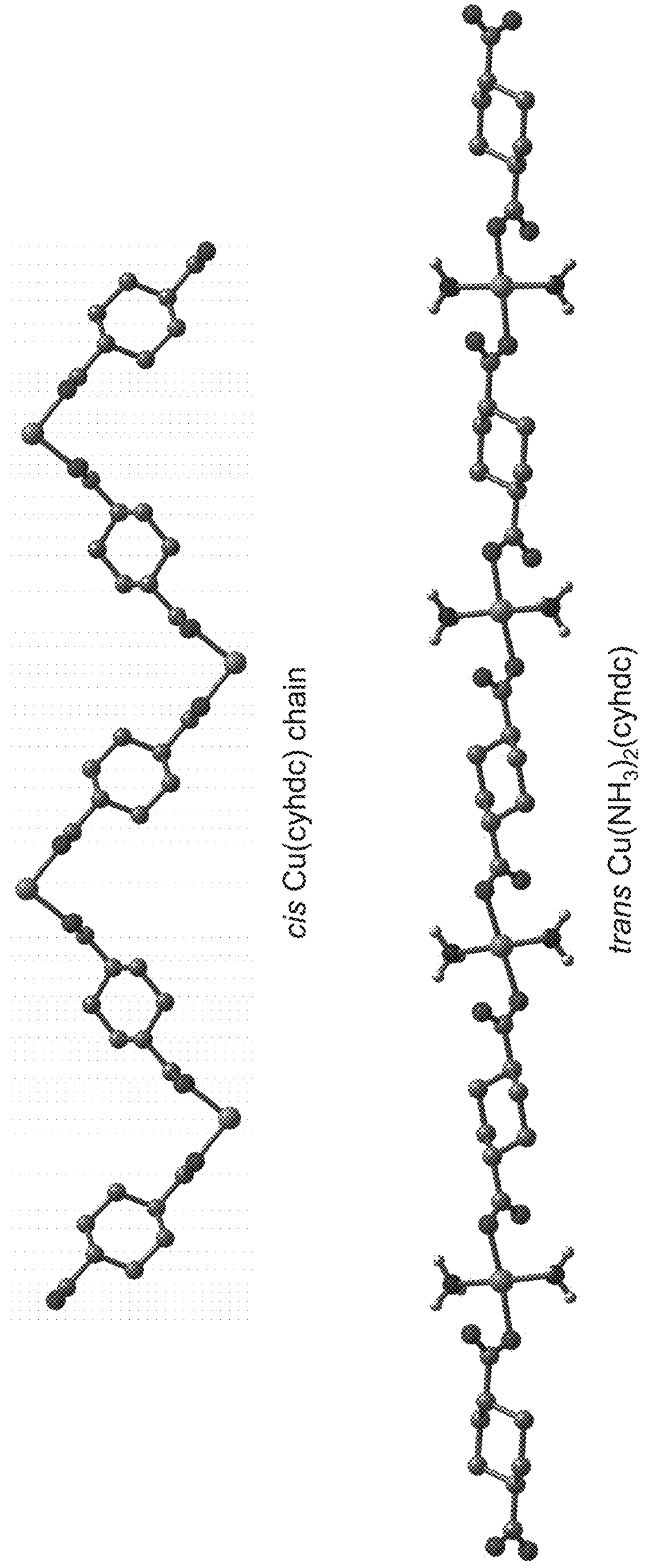
FIG. 6 depicts the relationship between the structures of trans-$Cu(NH_3)_2$(cyhdc) (bottom) and cis-Cu(cyhdc) (top) framework materials.

Ammonia adsorption data collected for microcrystalline Cu(cyhdc) at 298 K revealed a stepwise uptake to approximately 16 mmol/g at a pressure of about 80 mbar is shown in FIG. 3. The uptake plateaus above 100 mbar, giving rise to a relatively flat post-step region and a saturation capacity of 17.5 mmol/g at 1 bar, corresponding to adsorption of 4 $NH_3$ per copper center.

Notably, as shown in FIG. 3, Cu(cyhdc) adsorbs minimal $N_2$ and $H_2$ under the same conditions and its gravimetric ammonia capacity is among the highest reported to date for porous solids (20-24 mmol/g at 298 K and 1 bar). The stepped adsorption characterized here for Cu(cyhdc) is fairly unique among ammonia adsorbents and is indicative of a phase change and/or cooperative transition following ammonia uptake. While step-shaped ammonia uptake has been characterized in select systems, including non-porous metal halides, the materials are thought to adsorb ammonia through pore-filling or intercalation mechanisms typically associated with slow uptake kinetics and/or low capacities.

When exposed to ammonia, the Cu(cyhdc) material changes color from green to blue, indicating a change in the coordination environment of copper(II). Powder x-ray diffraction analysis of Cu(cyhdc) dosed with 1 bar of $NH_3$ revealed that this blue solid is microcrystalline and forms a different phase than the MOF. X-ray diffraction analysis of single-crystals of this phase revealed that it is the non-porous, one-dimensional coordination polymer $Cu(NH_3)_4$(cyhdc).

The structure of $Cu(NH_3)_4$(cyhdc) consists of symmetry-equivalent copper(II) centers coordinated by four equatorial ammonia ligands ($d_{Cu—N}$=2.014(2) and 2.057(2) Å) and two axial bridging trans-1,4-cyclohexanedicarboxylate linkers bound via a single oxygen atom ($d_{Cu—O}$=2.468(2) Å). Each ammonia engages in hydrogen bonding interactions with secondary-sphere oxygen atoms (ranging from ~2.0 to 2.2 Å), and each carboxylate oxygen interacts with nearby $NH_3$ ligands, resulting in a stabilizing network of moderately short hydrogen bonds. Based on literature data correlating hydrogen bond lengths and enthalpies and density functional theory calculations, this network affords an estimated stabilization energy of at least 40 kJ/mol $NH_3$, which, together with strong ammonia binding, likely contributes significantly to the driving force for ammonia uptake. Preliminary analysis further suggests that the transition is associated with rapid adsorption kinetics and minimal material expansion, both desirable characteristics for solid ammonia sorbents.

As seen in FIG. 3, hysteresis is apparent upon isothermal ammonia desorption from $Cu(NH_3)_4$(cyhdc), and only half of the ammonia is desorbed at 1 mbar, suggesting the formation of an intermediate structure with 2 $NH_3$/Cu. Indeed, after desorption the solid changes color from the characteristic blue of $Cu(NH_3)_4$(cyhdc) to purple. Powder x-ray diffraction analysis revealed that the purple solid is a new phase that forms from $Cu(NH_3)_4$(cyhdc). X-ray diffraction analysis of single crystals of this phase revealed it to be the one-dimensional solid $Cu(NH_3)_2$(cyhdc), featuring square planar copper(II) centers coordinated by two trans $NH_3$ and two trans carboxylate ligands bound via a single oxygen atom. Powder x-ray diffraction analysis confirmed that it is possible to regenerate porous Cu(cyhdc) from this phase (FIG. 5), and it has also been shown to be possible to regenerate Cu(cyhdc) directly from $Cu(NH_3)_4$(cyhdc).

This polymeric phase, with two ammonia molecules per copper center, is isostructural that is reported to form upon $NH_3$ uptake in Cu(bdc). However, the reported ammonia uptake of this material (~17 mmol/g at 298 K and 1 bar, but with a type 1 isotherm profile) corresponds closely to adsorption of four ammonia at each copper site. This discrepancy was attributed to an adventitious binding site that could not be resolved crystallographically, although the preliminary characterization of ammonia uptake in Cu(bdc) suggests that the phase with four ammonia molecules bound per copper may be amorphous. At present, is unclear why Cu(bdc) becomes amorphous under ammonia exposure while Cu(cyhdc) yields a crystalline product.

Thermogravimetric analysis (TGA) of the $Cu(NH_3)_4$(cyhdc) material revealed that ammonia desorption under a flow of $N_2$ occurs in two steps at 50° C. and 125° C., each associated with loss of two $NH_3$, and TGA cycling experiments revealed that ammonia adsorption in Cu(cyhdc) and stepwise desorption via $Cu(NH_3)_2$(cyhdc) is robust over at least six adsorption/desorption cycles with no apparent loss in $NH_3$ capacity (~30 wt % or 17.4 mmol/g). A closer examination of the structures of Cu(cyhdc) and $Cu(NH_3)_2$(cyhdc) provides insight into the stability of this transformation. The $Cu(NH_3)_2$(cyhdc) structure features trans Cu(cyhdc) chains (FIG. 6 bottom), whereas cis Cu(cyhdc) chains (FIG. 6 top) can be considered as a basis for the structure of Cu(cyhdc). Bringing together cis Cu(cyhdc) chains in the same plane generates two-dimensional square grids with copper paddlewheel nodes, which can be linked via dangling carboxylate oxygen atoms from adjacent grids to form the three-dimensional framework. Thus, the transformation from $Cu(NH_3)_2$(cyhdc) to Cu(cyhdc) can in principle be accomplished without cleaving a fundamental component of both structures, the Cu(cyhdc) chains.

Heats of adsorption for ammonia binding at open metal sites of the framework typically range from −50 kJ/mol to more than −100 kJ/mol. Such highly exothermic adsorption would substantially limit the performance of an adsorbent in an adiabatic separation process or require additional energy and infrastructure to efficiently remove waste heat. However, the phase change that occurs upon ammonia adsorption in Cu(cyhdc) could be sufficiently endothermic to offset a high heat of adsorption.

Figure 7:
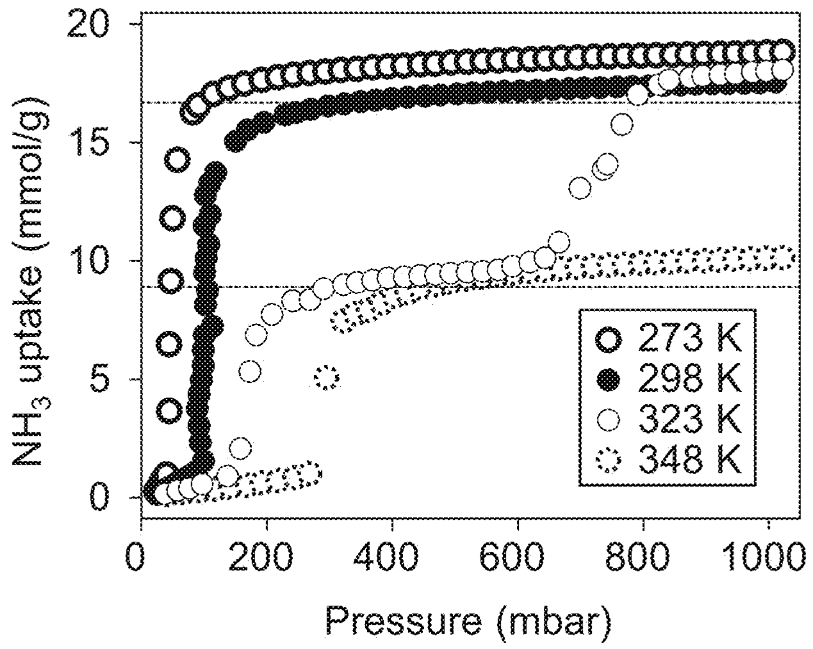
FIG. 7 is a plot of ammonia adsorption isotherms collected for Cu(cyhdc) at various temperatures, revealing the temperature-dependent nature of the cooperative framework-to-chain solid phase change. Dashed horizontal lines correspond to predicted capacities associated with two (lower) and four (upper) ammonia per copper, respectively.
Figure 8:
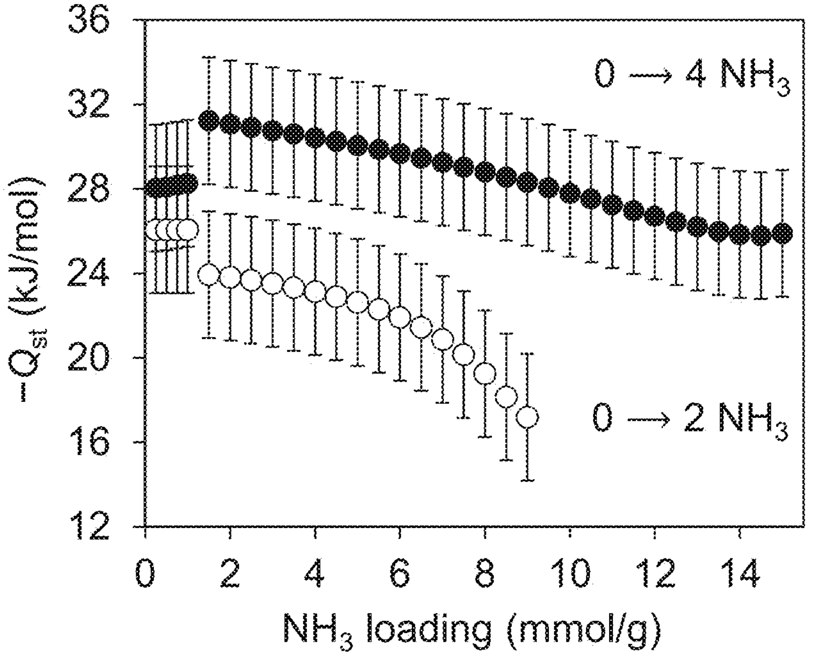
FIG. 8 is a plot of isosteric heat of $NH_3$ adsorption showing the variation in isosteric heat of $NH_3$ adsorption with increasing loading. The isosteric heats calculated from fits to the 273 K and 298 K isotherm data (upper circles), reflect the direct conversion of Cu(cyhdc) to $Cu(NH_3)_4$(cyhdc), while values calculated from fits to the 323 K and 348 K isotherm data from 0 to 500 mbar (lower circles), reflect the conversion of Cu(cyhdc) into $Cu(NH_3)_2$(cyhdc).

To investigate this possibility, ammonia adsorption isotherms for Cu(cyhdc) were collected at additional temperatures of 273 K, 323 K, and 348 K over a pressure range of 0 to 1 bar. The isotherms are shown in FIG. 7. At 273 K, stepped ammonia uptake occurs with an onset pressure of ~22 mbar and the material saturates at 1 bar with a capacity of 18.7 mmol/g, reflecting the direct conversion of Cu(cyhdc) to $Cu(NH_3)_4$(cyhdc). At 323 K there are two adsorption steps at 130 mbar and 630 mbar, each corresponding to uptake of ~2 $NH_3$/Cu, indicating stepwise conversion of Cu(cyhdc) to $Cu(NH_3)_2$(cyhdc) to $Cu(NH_3)_4$(cyhdc). At 348 K, a single step occurs at 260 mbar and the uptake plateaus at 10.2 mmol/g and 1 bar, corresponding to the adsorption of ~2 $NH_3$/Cu.

From fits to isotherm data collected at 273 K and 298 K, an isosteric heat of adsorption of −31±3 kJ/mol $NH_3$ was calculated with the transformation of Cu(cyhdc) to $Cu(NH_3)_4$(cyhdc). The isotherm of FIG. 8 (top) fits to the first step in the 323 K and 348 K data afforded an isosteric heat of adsorption of −24±3 kJ/mol, corresponding to the conversion of Cu(cyhdc) to $Cu(NH_3)_2$(cyhdc) seen in FIG. 8 (bottom). An isosteric heat of adsorption of −39±4 kJ/mol $NH_3$ was extrapolated, corresponding to conversion of $Cu(NH_3)_2$(cyhdc) into $Cu(NH_3)_4$(cyhdc) at higher temperatures. In all, these low isosteric heats reflect the extent to which exothermic Cu—$NH_3$ bond formation is offset by phase changes involving endothermic Cu—O bond cleavage. Similarly, exothermic Cu—O bond formation during the transition from $Cu(NH_3)_4$(cyhdc) to Cu(cyhdc) likely facilitates regeneration at a lower temperature (125° C.) than is typically required to regenerate MOFs that adsorb ammonia in the absence of a phase change (200° C. to 280° C.).

The ammonia adsorption in Cu(cyhdc) at higher temperatures (373 K, 423 K, 448 K, and 458 K) and ammonia pressures (0 to 6 bar) was demonstrated that are conditions more relevant to proposed alternative methods for renewable ammonia synthesis. These challenging conditions are rarely explored for ammonia adsorption in typical MOFs. At 373 K, the ammonia adsorption profile features two steps indicative of cooperative gas adsorption, each corresponding to uptake of approximately 2 $NH_3$ per Cu as observed at 323 K and pressures up to 1 bar (FIG. 7), and the uptake plateaus at 16.8 mmol/g above 4.5 bar. At 423 K, 448 K, and 458 K, the ammonia uptake is also associated with two adsorption steps, each corresponding to ~1 $NH_3$/Cu and illustrated in FIG. 10, FIG. 11 and FIG. 12.

There is also some temperature dependence observed in the uptake in the plateau region after the first step (4.2 mmol/g at 423 K versus 3.0 mmol/g at 458 K). A maximum uptake of ranging from 8.2 to 8.6 mmol/g was achieved at 423 K, 448 K, and 458 K at pressures of 1.2 bar, 3.0 bar, and 5.0 bar, respectively, suggesting the formation of a species with 2 $NH_3$/Cu. These adsorption phenomena suggest that cooperative ammonia insertion also occurs in Cu(cyhdc) at higher temperatures and pressures. Of note, uptake of $N_2$ and $H_2$ is negligible at high temperature and pressures up to 6 bar.

Substantial hysteresis was observed upon desorption at each temperature, likely reflecting structural transitions that occur upon ammonia desorption. At low pressure, the desorption isotherms plateau at an uptake of about 1 $NH_3$/Cu, possibly due to the formation of a $Cu(NH_3)$(cyhdc) phase. At 423 K and 448 K, this final equivalent of ammonia remains bound at the lowest pressures (10 mbar), whereas at 458 K it is possible to desorb nearly all of the ammonia. Preliminary analysis of ammonia desorption from Cu(cyhdc), following dosing at 6 bar and high temperatures, revealed as of yet unidentified crystalline products, suggesting more complex desorption behavior than at lower pressures and temperatures, although the material appears to be regenerable, although a slight decomposition is evident after prolonged exposure at 6 bar and 458 K.

An estimated working capacity of 5.4 mmol/g can be achieved with a modest pressure swing (between 1.2 and 0.05 bar at 423 K), temperature swing (between 373 and 458 K at 750 mbar), or pressure-temperature swing (between 1.2 bar/423 K and 0.75 bar/458 K). Under these conditions, Cu(cyhdc) outperforms top conventional solid sorbents used for ammonia capture, including select MOFs and supported metal halides.

Figure 9:
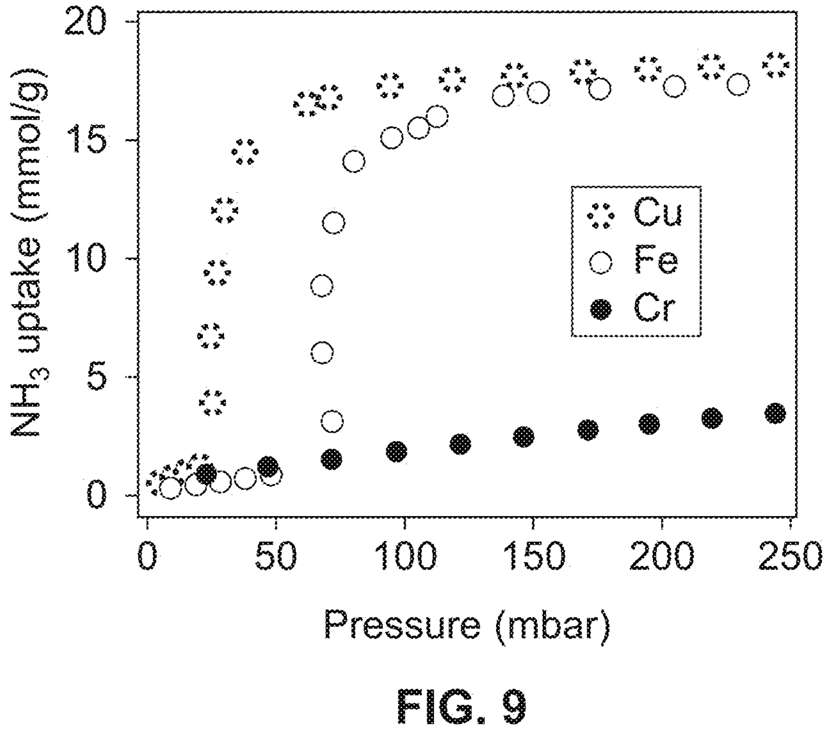
FIG. 9 is a plot of ammonia adsorption data obtained at 273 K for microcrystalline Cu(cyhdc), Fe(cyhdc), and Cr(cyhdc).
Figure 10:
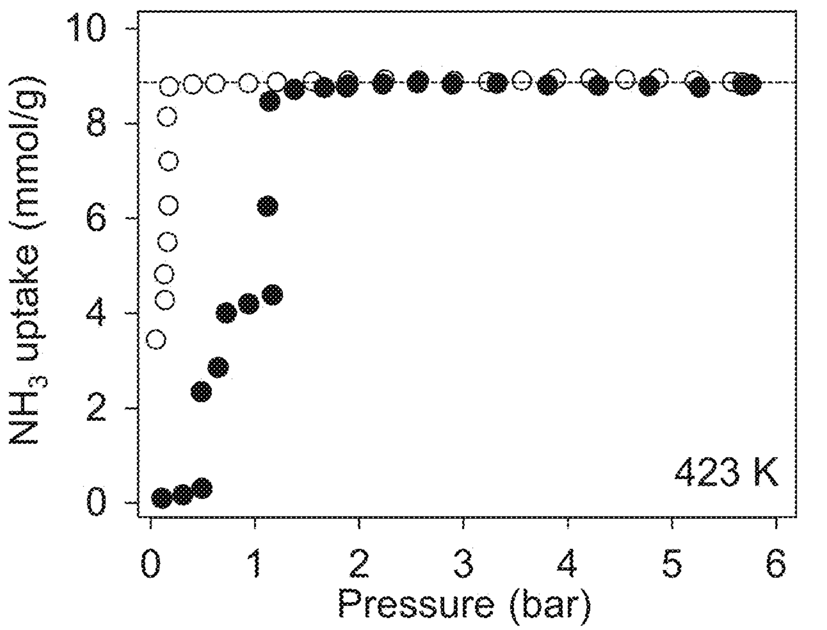
FIG. 10 is a plot of high pressure (0-6 bar) ammonia adsorption (filled circles) and desorption (empty circles) data collected for Cu(cyhdc) at 423 K.
Figure 11:
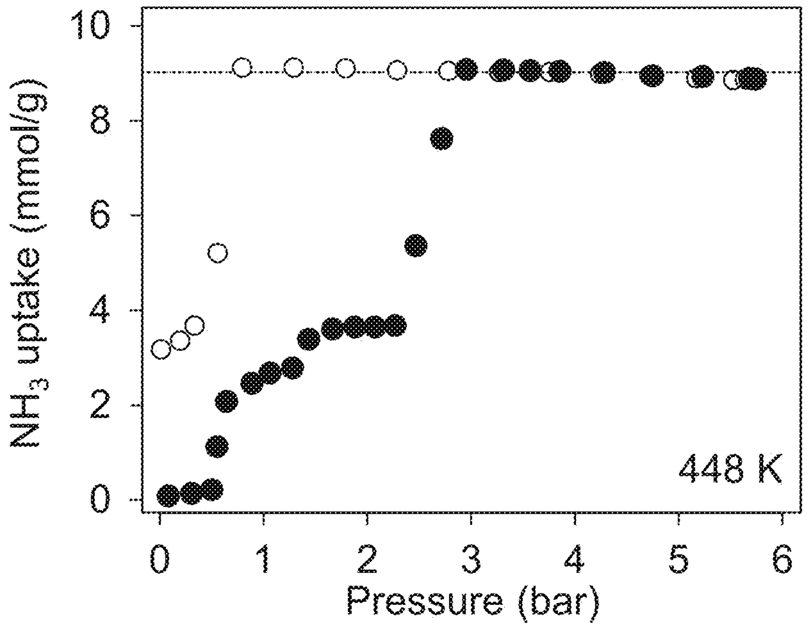
FIG. 11 is a plot of high pressure (0-6 bar) ammonia adsorption (filled circles) and desorption (empty circles) data collected for Cu(cyhdc) at 448 K.
Figure 12:
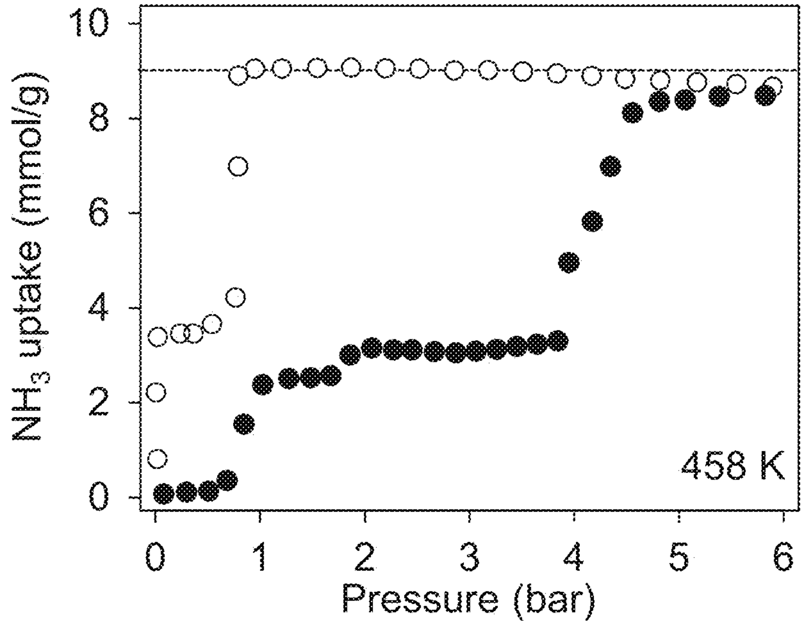
FIG. 12 is a plot of high pressure (0-6 bar) ammonia adsorption (filled circles) and desorption (empty circles) data collected for Cu(cyhdc) at 458 K. Dashed lines indicate uptake corresponding to a two ammonia molecules per copper center.

To further demonstrate the family of frameworks and the versatility of this adsorbent platform, two new crystalline, porous frameworks Fe(cyhdc) and Cr(cyhdc) were synthesized that are isostructural to the Cu(cyhdc) framework. At 273 K, the Fe(cyhdc) material exhibits stepped ammonia adsorption corresponding to 4 $NH_3$/Fe, with an onset pressure of 70 mbar (c.f. 20 mbar) for Cu(cyhdc), as shown in FIG. 9. Powder x-ray diffraction analysis of Fe(cyhdc) dosed with 1 bar of $NH_3$ at 298 K suggests the formation of a one-dimensional structure akin to that of $Cu(NH_3)_4$(cyhdc). While the Cr(cyhdc) material exhibits only low ammonia uptake at 298 K and 1 bar, high-pressure adsorption data revealed stepped uptake of approximately 4 $NH_3$/Cr above 4 bar. The relative ammonia affinities of Fe(cyhdc) and Cu(cyhdc) are consistent with the Irving-Williams series, whereas the much lower ammonia affinity of Cr(cyhdc) likely reflects an additional driving force required to cleave the metal-metal quadruple bond within each chromium paddlewheel node.

Frameworks with more labile copper-carboxylate bonds are expected to adsorb ammonia with even lower step pressures than Cu(cyhdc). To test this hypothesis, the following frameworks were synthesized: Cu(bpdc) ($bpdc^{2-}$=4,4'-biphenyldicarboxylate) and Cu(tfbdc) ($tfbdc^{2-}$=2,3,5,6-tetrafluoro-1,4-benzenedicarboxylate), which are isoreticular to Cu(cyhdc) but feature weaker carboxylate donors. As expected, the $NH_3$ adsorption step shifts to lower pressures upon moving from Cu(cyhdc) to Cu(bpdc) to Cu(tfbdc). In fact, the Cu-carboxylate bonds of Cu(tfbdc) are sufficiently weak to enable cooperative adsorption of water.

In summary, the mechanism of ammonia insertion into the copper-carboxylate bonds of Cu(cyhdc) material drives a robust, reversible cooperative phase change at low pressures, which enables rapid, high-capacity ammonia uptake with intrinsic thermal management. Preliminary analysis indicates that Cu(cyhdc) exhibits cooperative ammonia uptake at even higher pressures and temperatures relevant to sustainable methods for ammonia synthesis. More broadly, the foregoing results represent an important conceptual advance for the design of cooperative adsorbents for low-energy storage and separation applications involving coordinating gas molecules.

The technology described herein may be better understood with reference to the accompanying examples, which are intended for purposes of illustration only and should not be construed as in any sense limiting the scope of the technology described herein as defined in the claims appended hereto.

Example 1

To demonstrate the breadth and functionality of the family of frameworks, several members of the group were synthesized and evaluated. The Cu(cyhdc), Cu(bdc), Cr(cyhdc), Fe(cyhdc), Cu(bpdc) and Cu(tfbdc) frameworks were synthesized to illustrate the ammonia selective capture mechanism and the versatility of the family of frameworks.

The framework Cu(cyhdc) was prepared using a 250 mL bottle that was charged with $Cu(NO_3)_2\cdot2.5H_2O$ (2.326 g, 0.01000 mol), trans-1,4-cyclohexanedicarboxylic acid (1.722 g, 0.01000 mol) and 100 mL N,N'-dimethylformamide. The blue solution was heated for 16 hours in an oven at 90° C. The resulting green-blue precipitate was isolated by filtration and rinsed 3 times with 25 mL aliquots of fresh N,N'-dimethylformamide. The precipitate was then rinsed 3 times with 25 mL aliquots of methanol, soaked in 100 mL of fresh methanol for 24 hours (2 times), and then stored under 100 mL fresh methanol in a tightly sealed jar. The framework was activated by heating at 150° C. under vacuum for 18 to 24 hours. No color change was observed upon activation. This procedure yielded approximately 2 grams of activated material and the process could be readily scaled up by a factor of 2.5. Advantageously, Cu(cyhdc) was made from inexpensive starting materials ($H_2$cyhdc is commercially available for about $600/kg) and is stable in the presence of $H_2O$ vapor and 02, allowing for facile handling under ambient conditions.

The framework Cu(bdc) was prepared by charging a 250 mL bottle with $Cu(NO_3)_2\cdot2.5H_2O$ (2.326 g, 0.01000 mol), 1,4-benzenedicarboxylic acid (1.661 g, 0.01000 mol) and 100 mL N,N'-dimethylformamide. The bottle was sealed, and the blue solution was heated 16 hours in an oven at 90° C. The resulting pale blue precipitate was isolated by filtration and rinsed 3 times with 25 mL aliquots of fresh N,N'-dimethylformamide. The precipitate was then rinsed 3 times with 25 mL aliquots of methanol, soaked in 100 mL of fresh methanol for 24 hours (2 times), and then stored under 100 mL fresh methanol in a tightly sealed jar. The material changed color to a darker shade of blue upon activation and slowly degrades in the presence of atmospheric moisture.

Synthesis of Cr(cyhdc) began with charging a 20 ml vial with anhydrous $CrCl_2$ (0.200 g, 0.00163 mol), trans-1,4-cyclohexanedicarboxylic acid (0.172 g, 0.00100 mol), 8 mL of N,N'-dimethylformamide, and 1 mL methanol in a dry $N_2$ glovebox. The blue solution was heated for 18 hours on a hot plate at 120° C., resulting in a fine orange precipitate that was collected by filtration. The solid was rinsed 3 times with 10 mL aliquots of methanol, then soaked in 10 mL fresh methanol for 24 hours (2 times). No color change was observed upon activation. This material is very sensitive to 02 and will change color from salmon orange to brown in a matter of seconds upon exposure to pure 02 or air. The material exposed to pure 02 remains crystalline. However, it degrades rapidly upon exposure to ambient air, changing color from brown to green in minutes with loss of crystallinity.

For the synthesis of Fe(cyhdc), a 20 mL vial was charged with anhydrous $FeCl_2$ (0.200 g, 0.00158 mol), trans-1,4-cyclohexanedicarboxylic (0.172 g, 0.00100 mol), 8 mL of N,N'-dimethylformamide, and 1 mL methanol in a dry $N_2$ glovebox. The faint yellow solution was heated for 18 hours on a hot plate at 120° C., resulting in a gray precipitate that was collected by filtration. The solid was rinsed 3 times with 10 mL aliquots of methanol, then soaked in 10 mL fresh methanol for 24 hours (2 times). No color change was observed upon activation. This material was slightly sensitive to 02, and upon exposure to pure 02 or ambient atmosphere it slowly changed color from light gray to pale yellow over the course of 24 hours.

Synthesis of Cu(bpdc) was accomplished by charging a 250 mL bottle with $Cu(NO_3)_2\cdot2.5H_2O$ (2.326 g, 0.01000 mol), biphenyl-4,4'-dicarboxylic acid (1.211 g, 0.005000 mol), and 100 mL N,N'-dimethylformamide. The blue solution was heated for 16 hours in an oven at 90° C. The resulting teal precipitate was isolated by filtration, and rinsed 3 times with 25 mL fresh N,N'-dimethylformamide. The precipitate was then rinsed 3 times with 25 mL aliquots of methanol, soaked in 100 mL fresh methanol for 24 hours (2 times), and then stored under 100 mL fresh methanol in a tightly sealed jar. The material changed color subtly to a darker blue upon activation and slowly degraded in the presence of atmospheric moisture.

The Cu(tfbdc) framework was synthesized by charging a 250 mL bottle with $Cu(NO_3)_2\cdot2.5H_2O$ (2.326 g, 0.01000 mol), tetrafluoroterephthalic acid (2.381 g, 0.01000 mol), and 100 mL ethanol. The resulting blue solution was heated for 16 hours in an oven at 60° C. The resulting pale blue precipitate was isolated by filtration and rinsed 3 times with 25 mL fresh ethanol. Finally, the material was soaked in 100 mL fresh ethanol for 24 hours (2 times) and stored under 100 mL fresh ethanol. The resulting solid was isolated by vacuum filtration and heated to 120° C. under dynamic vacuum for 18 hours to obtain activated Cu(tfbdc). The activated material was a dark blue-green color and highly sensitive to moisture. This material is also more temperature sensitive than the other Cu frameworks and activation at 150° C. was noted to cause some browning of the material.

Example 2

Framework materials with and without ammonia insertion were crystallized for x-ray diffraction and structural analysis. Single crystals of $Cu(NH_3)_4$(cyhdc) were prepared by placing approximately 20 mg Cu(cyhdc) in a 20 mL vial. A 2.0 M solution of $NH_3$ in methanol was added until the framework was observed to almost completely dissolve, resulting in a blue saturated solution. Crystals of $Cu(NH_3)_4$(cyhdc) suitable for single-crystal x-ray diffraction were grown via vapor diffusion. 1 mL of the saturated solution was added to an open 1.8 mL vial, which was then placed in a closed 20 mL vial containing 3 mL tetrahydrofuran (THF). Brilliant blue needles formed after standing for 1 to 2 days. Methanol and N,N'-dimethylformamide are also effective anti-solvents in this scheme. Unlike microcrystalline $Cu(NH_3)_4$(cyhdc), prepared by dosing Cu(cyhdc) with gaseous $NH_3$, single crystals of $Cu(NH_3)_4$(cyhdc) prepared in this way were relatively stable, with gradual spontaneous loss of ammonia leading to crystal degradation over the course of hours rather than minutes.

Direct synthesis of $Cu(NH_3)_2$(cyhdc) to produce microcrystals was accomplished by placing approximately 50 mg Cu(cyhdc) was placed in a 20 mL vial and suspended in 18 mL methanol. A 1.5 mL solution of 2.0 M $NH_3$ solution in methanol was added in 0.25 mL increments over the course of two days. A color change to blue was observed that began within 30 minutes after introduction of the second 0.25 mL aliquot (0.5 mL total). The powder began to turn purple within 30 minutes of adding the fourth 0.25 mL aliquot. The supernatant remained colorless throughout. The resulting free-flowing bright purple powder was isolated by filtration, rinsed with three 10 mL aliquots of fresh methanol, and dried on a Schlenk line for 16 hours at room temperature.

Preparation of single crystals of $Cu(H_2O)_2$(tfbdc) was performed by adding 10 mL of de-ionized water directly to a sample of about 100 mg freshly activated Cu(tfbdc), resulting in a saturated solution. Then 5 mL of this saturated solution was filtered through a cotton pad to remove solid Cu(tfbdc) and allowed to stand in an open 20 mL vial on the bench. After evaporation of ~4 mL of this solution, blue plates of $Cu(H_2O)_2$(tfbdc) had formed alongside colorless needles, which were identified as a different phase based on powder x-ray diffraction analysis.

Crystals for evaluating the desorption of $NH_3$ from $Cu(NH_3)_2$(cyhdc) to form Cu(cyhdc) was performed by using approximately 50 mg of microcrystalline $Cu(NH_3)_2$(cyhdc) prepared as described above that was placed in a 20 mL vial and heated under dynamic vacuum (80 mbar) on a Schlenk line for 24 hours at each of the following temperatures in succession: 50° C., 75° C., 100° C., 125° C., 150° C., and 175° C. At the end of each 24-hour period, a sample of the solid was analyzed by powder x-ray diffraction (λ=Cu Kα). The resulting data were plotted and shown in FIG. 5.

Example 3

Powder X-ray diffraction of representative frameworks was performed and evaluated. Laboratory powder X-ray diffraction data were collected on a Bruker AXS D8 Advanced diffractometer equipped with a Cu Kα source (λ=1.54 Å). High-resolution synchrotron X-ray powder diffraction data were collected at beamline 17-BM at the Advanced Photon Source at Argonne National Laboratory with a Perkin-Elmer a-Si flat panel detector. Diffraction patterns were collected at a wavelength of 0.44850 Å and the sample temperature was held constant at 298 K with an Oxford Cryosystems Cryostream 800. Samples of the activated frameworks (~5 mg) were loaded into 1.0-mm boron-rich glass capillaries and flame sealed. Activated Cu(cyhdc) was loaded into a capillary in air, and flame sealed within 15 seconds of exposure to ambient conditions. Air-sensitive Cr(cyhdc) and Fe(cyhdc) were loaded into capillaries inside a dry $N_2$ glovebox, the capillaries were sealed with grease, and then taken into the air and quickly flame sealed. For $NH_3$-dosed samples, capillaries were loaded with approximately 5 mg of activated framework in air or a dry $N_2$ glove box and then attached to a gas cell. The gas cell was connected to the analysis port of a Micromeritics ASAP 2020 gas adsorption analyzer, evacuated to remove $N_2$ or air, and then dosed with 1 atm of $NH_3$. Capillaries were then flame sealed with ammonia in the headspace.

The structure analyses, including indexing and Pawley and Rietveld refinements, were performed with the program TOPAS-Academic v4.1.16. The structure of Fe(cyhdc) was refined using a simulated annealing approach where the asymmetric unit was constructed as a rigid body using z-matrix notation. Three degrees of rotation and translation were allowed for the entire rigid body and bond lengths and angles were allowed to refine freely within predefined limits. Atom positions for the Rietveld refinement were extracted from the simulated annealing refinement with the best goodness of fit and further optimized to yield the reported structure. A Pawley refinement was used to obtain unit cell parameters for Cr(cyhdc).

Single crystal X-ray diffraction analysis was performed on single crystals coated with Paratone-N oil and mounted on MiTeGen loops. The crystals were frozen at 100(2) K by an Oxford Cryosystems Cryostream 700. Data were collected at the UC Berkeley CHEXRAY crystallographic facility on a Rigaku XtaLAB P200 equipped with a MicroMax 007HF rotating anode and a Pilatus 200K hybrid pixel array detector using Cu Kα radiation (λ=1.5418 Å). Data collection, processing, and reduction were performed with CrysAlis$^{Pro}$ software. A multi-scan absorption correction was applied using the SCALE3 ABSPACK scaling algorithm within CrysAlis$^{Pro}$. No significant crystal decay was observed during data collection. Structures of $Cu(NH_3)_4$(cyhdc), $Cu(NH_3)_2$(cyhdc), and $Cu(NH_3)_2(H_2O)$(cyhdc) were solved by intrinsic phasing with SHELXT and $Cu(H_2O)_2$(tfbdc) was solved using direct methods with SHELXS. The structure of $Cu(H_2O)_2$(tfbdc) was solved as a two-component twin [−1 0 0 0 −1 0 0.1288 0.5342 1; BASF=0.487(2)]. All structures were refined using SHELXL operated in the OLEX2 interface. Thermal parameters were refined anisotropically for all non-hydrogen atoms. For $Cu(NH_3)_4$(cyhdc) and $Cu(NH_3)_2$(cyhdc), hydrogen atoms were included at the geometrically calculated positions and refined using a riding model. For $Cu(H_2O)_2$(tfbdc) and $Cu(NH_3)_2(H_2O)$(cyhdc), hydrogen atoms were found in the electron difference map.

Powder X-ray diffraction data tracking the conversion of $Cu(NH_3)_4$(cyhdc) to Cu(cyhdc) with heating under dynamic vacuum was evaluated. The starting sample of $Cu(NH_3)_4$(cyhdc) was prepared by dosing Cu(cyhdc) with 1 bar $NH_3$ at 298 K. Samples were held at the indicated temperatures for 24 hours. The powder X-ray diffraction pattern for pristine Cu(cyhdc) (generated from the single-crystal structure of Cu(cyhdc) with a full-width half-max of 1.2° 2θ) is shown for comparison. While peak broadening is observed upon desorption of ammonia, re-dosing the regenerated framework with gaseous $NH_3$ resulted in peak narrowing.

Comparison of powder X-ray diffraction patterns for pristine Cu(cyhdc) (green trace) and for the sample after partial and complete loading with $NH_3$ at 298 K indicated that, at this temperature, $NH_3$ adsorption involves a direct transition from Cu(cyhdc) to $Cu(NH_3)_4$(cyhdc), with no intermediate phase observed.

Portions of the structure of $Cu(NH_3)_2$(cyhdc) obtained from single crystal X-ray diffraction analysis, showed hydrogen bonding interactions between two neighboring chains. The long-range order in the crystal structure of $Cu(NH_3)_2$(cyhdc) was also diagramed. The crystal structure contains three symmetrically distinct copper(II) ions, designated $Cu_A$, $Cu_B$, and $Cu_C$. The $Cu_B$ and $Cu_C$ lie on inversion centers. There are therefore three symmetrically distinct linkers, defined by the species of Cu they bridge ($Cu_A$—$Cu_B$/$Cu_B$—$Cu_A$, $Cu_A$—$Cu_C$/$Cu_C$—$Cu_A$, and $Cu_B$—$Cu_C$/$Cu_C$—$Cu_B$). Within a given chain, the ordering of copper(II) ions is $Cu_A$—$Cu_B$—$Cu_A$—$Cu_C$—. Chains were offset with respect to their neighbors.

Example 4

Gas adsorption measurements of several representative frameworks for ammonia and other gases were conducted. Gas adsorption isotherms were collected using a Micromeritics ASAP2420 or Micromeritics 3Flex gas adsorption analyzer. Metal-organic framework samples of approximately 40-60 mg of were transferred to pre-weighed analysis tubes, which were then capped with TranSeals. Unless specified otherwise, samples were activated by heating to 150° C. with a ramp rate of 0.2° C./min under dynamic vacuum until an outgas rate of less than 2 μbar/min was achieved (typically 18 hours). The evacuated analysis tube containing the activated sample was then reweighed to determine the sample mass. For isotherms collected at 298 K, 323 K, and 348 K, samples were immersed in a Syntherm bath heated with a water recirculator. Isotherms collected at 273 K were measured using an ice water bath. Then, $N_2$ isotherms collected at 77 K were measured using a liquid nitrogen bath. Langmuir surface areas were calculated from 77 K $N_2$ adsorption data (from points in the 50-250 mbar region) using Micromeritics software. Oil-free vacuum pumps and oil-free pressure regulators were used for all measurements to prevent contamination of the samples during the evacuation process or of the feed gases during the isotherm measurements.

Isosteric heats of $NH_3$ adsorption ($Q_{st}$) were calculated. The isosteric heat for the direct conversion of Cu(cyhdc) to $Cu(NH_3)_4$(cyhdc) was calculated from 273 K and 298 K isotherms and plotted in FIG. 7. The isosteric heat for the conversion of Cu(cyhdc) to $Cu(NH_3)_2$(cyhdc) was calculated from the 323 K and 348 K isothermal data collected below 500 mbar as illustrated in FIG. 7 (covering the first adsorption step). In both cases, the isosteric heats determined for ammonia adsorption below 1 mmol/g reflect pore filling. Error bars of ±3 kJ/mol associated with the calculated values allow for ±1 K error in measurement temperature and ±5% error in the equilibrium pressure. This is likely an overestimate of the measurement error.

Interestingly, the calculated isosteric heats of adsorption (−31±3 kJ/mol $NH_3$ associated with the transformation of Cu(cyhdc) to $Cu(NH_3)_4$(cyhdc); −24±3 kJ/mol, corresponding to the conversion of Cu(cyhdc) to $Cu(NH_3)_2$(cyhdc); and −39±4 kJ/mol $NH_3$ corresponding to conversion of $Cu(NH_3)_2$(cyhdc) to $Cu(NH_3)_4$(cyhdc)) indicate that conversion from $Cu(NH_3)_2$(cyhdc) to Cu(cyhdc) is associated with a lower heat of desorption than the conversion from $Cu(NH_3)_4$(cyhdc) to $Cu(NH_3)_2$(cyhdc). Our TGA data showed that the former transition is associated with a higher desorption temperature (125° C. versus 50° C.). This likely reflects the presence of a large activation barrier associated with the significant structural rearrangement that occurs upon transitioning from $Cu(NH_3)_2$(cyhdc) to Cu(cyhdc).

Kinetics of $NH_3$ adsorption in Cu(cyhdc) and volume changes upon $NH_3$ uptake were analyzed. Kinetic data were collected using a Micromeritics ASAP 3Flex volumetric analyzer. A glass tube containing 38.6 mg of activated Cu(cyhdc) was dosed with 1.54 mmol $NH_3$. The temperature of the sample was controlled using a Syntherm bath held at 25° C. by a water recirculator. The temperature at the outer surface of the tube was monitored throughout the experiment with a K-type thermocouple. The pressure decay was recorded as a function of time using a sampling frequency of 2 Hz, and the uptake of $NH_3$ was calculated from mass balance. This preliminary kinetics analysis indicates that $NH_3$ adsorption in Cu(cyhdc) is rapid, with an estimated a $t_{1/2}$<40 s at 298 K and 1 bar $NH_3$. In contrast, metal halides must be dispersed in a porous support (e.g., silica, zeolites) to achieve sufficiently rapid adsorption kinetics and stability over many uptake-release cycles, as well as to remedy issues related to the large volume expansion of these materials upon $NH_3$ adsorption (up to 400%). Using the unit cell parameters for $Cu(NH_3)_4$(cyhdc) and those for Cu(cyhdc), it was determined that the framework-to-polymer transition triggered by ammonia uptake in Cu(cyhdc) is associated with just a 20% volume expansion.

Example 5

High pressure $NH_3$ adsorption measurements for several frameworks in the family were conducted. Ultra-high purity grade $NH_3$ (99.999%, Praxair) was used for all experiments. Activated Cu(cyhdc) (~130-180 mg) was transferred into a high-pressure sample holder with an isolation valve in an $N_2$ filled glovebox. A stainless-steel dowel was placed in the holder to minimize the dead space. High-pressure ammonia isotherms (up to 6 bar) were measured in a walk-in fume hood using an HPVA 11-200 High-Pressure Volumetric Analyzer from Micrometrics.

Isotherms were collected by dosing $NH_3$ to the sample in a stepwise fashion, and each data point was taken after sufficient time for equilibration (typically 2 to 4 hours for steep uptake regions). Data collection was carried out manually, and as a result of the lengthy experimental times (on the order of 4-6 days), select data points were left to equilibrate for longer periods (e.g., overnight), leading to small spurious jumps in the plateau region below 2 bar in the plots of FIG. 10, FIG. 11 and FIG. 12. The sample holder temperature was controlled using either a sand bath (100° C. to 185° C.) or Julabo ME circulator filled with water/ethylene glycol (25° C.). For all isotherms, ambient and analysis temperature free space correction was carried out using ultra-high purity He gas (99.999%, Praxair).

The stability of Cu(cyhdc) following $NH_3$ adsorption at high temperatures and pressures was also evaluated. As discussed above, $NH_3$ adsorption data obtained for Cu(cyhdc) at temperatures of 423 K and above and pressures up to 6 bar suggest the formation of a solid with two $NH_3$ bound per copper site. Direct characterization of this species in situ was not possible with the experimental set up. However, the stability and reversibility of ammonia adsorption at higher temperatures and pressures was analyzed by exposing a sample of Cu(cyhdc) to 6 bar of $NH_3$ at 423 K (150° C.) for 10 minutes and analyzed the powder diffraction pattern of a portion of the solid (i) after reducing the temperature to 298 K and depressurizing the ammonia to atmospheric pressure and (ii) after subsequently removing ammonia with heating at 165° C. under dynamic vacuum for 18 hours using the degas port of an ASAP 2020HD gas adsorption analyzer. The same manipulations were carried out for a sample initially exposed to 6 bar ammonia for 3 hours at 458 K (185° C.). After cooling and depressurization, samples containing adsorbed ammonia were handled quickly to minimize exposure time to ambient atmosphere. After each manipulation, a portion of the resulting solid was characterized using ex situ powder x-ray diffraction analysis. Data were collected from sealed capillaries packed to the same height (10 mm) with powder, enabling semi-quantitative analysis of peak intensities.

The ex situ powder x-ray diffraction patterns collected for the 423 K (150° C.)/6 bar $NH_3$ sample after cooling to room temperature and depressurization features peaks corresponding to $Cu(NH_3)_4$(cyhdc) as well as new sharp reflections due to an unidentified phase or phases. Powder X-ray diffraction data collected upon subsequent desorption of ammonia at 165° C. under dynamic vacuum feature reflections due to Cu(cyhdc), indicating that ammonia adsorption under these conditions is partially reversible. There were also sharp reflections observed from a second, as of yet unidentified phase.

Similar results were obtained for the sample initially heated at 458 K (185° C.) under 6 bars of ammonia. In particular, the powder pattern collected after cooling to room temperature and depressurization featured peaks assignable to $Cu(NH_3)_4$(cyhdc) and sharp reflections associated with the initial component, but additional new peaks were also present. Following regeneration of this sample at 448 K (175° C.) for 3 hours, the powder pattern features peaks associated with Cu(cyhdc) as well as the unidentified phase, although less of the latter is present in this sample relative to what was present in the sample regenerated after dosing with 6 bar $NH_3$ at 423 K. It should also be noted that some irreversible browning of the material was observed after the 3-hour exposure to 6 bar ammonia at 185° C., suggesting that some decomposition occurs as a result of exposure to this higher temperature and/or for a longer contact time. No such browning is observed if the parent framework Cu(cyhdc) is heated to 185° C. for multiple hours under dynamic vacuum, however.

Finally, in a third manipulation, the regenerated sample resulting from dosing at 423 K and 6 bar $NH_3$ was then re-dosed with 1 bar of $NH_3$ at room temperature for 10 minutes. Ex situ powder diffraction analysis of the resulting solid suggests that both Cu(cyhdc) and component b convert to $Cu(NH_3)_4$(cyhdc) under these conditions. Additionally, the infrared spectrum of this same sample essentially overlays with that of freshly-prepared $Cu(NH_3)_4$(cyhdc). Thus, these preliminary data indicate that, while the mechanism of ammonia uptake in Cu(cyhdc) at high pressures and temperatures is different (and perhaps more complex) than at room temperature and pressures up to 1 bar, ammonia can be desorbed and re-adsorbed at least once to generate $Cu(NH_3)_4$(cyhdc) at 1 bar of ammonia.

Example 6

Thermogravimetric analyses (TGA) of various frameworks were performed using a TA Instruments Discovery TGA. Thermogravimetric analysis of $NH_3$ desorption from $Cu(NH_3)_4$(cyhdc) was prepared using humid $NH_3$ over the course of six cycles. For each cycle, the material was heated from 25 to 160° C. (ramp rate of 1° C./min), held for 60 min at 160° C., and then cooled to 25° C. The sample was subsequently dosed with humid ammonia at 25° C. for 12 min before another desorption cycle.

Decomposition experiments were performed under dry $N_2$ (flow rate=25 mL/min) at a ramp rate of 1° C./min. For TGA cycling tests, approximately 10 mg of activated Cu(cyhdc) was placed in a tared TGA pan and then dosed with 1 bar of $NH_3$ using a Micromeritics 3Flex gas adsorption analyzer. After sitting for 30 minutes under an atmosphere of pure $NH_3$, the TGA pan was then quickly transferred to the TGA instrument. It was observed that $Cu(NH_3)_4$(cyhdc) that is prepared via gas dosing in this way is sensitive to ambient atmosphere and will lose $NH_3$ and adsorb atmospheric water. A sample of $Cu(NH_3)_4$(cyhdc) held in a TGA pan will retain its blue color and is pure via powder x-ray diffraction analysis provided it is not exposed to air for more than −60 sec. While a thin layer of $Cu(NH_3)_4$(cyhdc) spread out on a flat surface will change color much more rapidly, with some color change evident after 1 min.

In the TGA instrument, the sample of $Cu(NH_3)_4$(cyhdc) was heated to 160° C. at a rate of 1° C./min and then held isothermally for 60 min, all under a flow of $N_2$ (25 mL/min), in order to desorb all ammonia. The temperature was then ramped down to a final temperature of 25° C. at 5° C./min. This adsorption/desorption procedure was repeated six times on the same sample. After the sixth cycle, a portion of the material was placed in a glass capillary and dosed a seventh time with $NH_3$. The powder x-ray diffraction pattern of the resulting solid overlays with the pattern were obtained upon initial dosing with ammonia.

Example 7

The adsorption $NH_3$ by the frameworks under humid conditions was assessed. At short exposure times of approximately 12 minutes, the Cu(cyhdc) was shown to adsorb ammonia selectively in the presence of humidity to form $Cu(NH_3)_4$(cyhdc). However, even at this short contact time, weak reflections from a new phase can be identified in the powder x-ray diffraction pattern of the resulting solid.

Powder x-ray diffraction patterns collected for a sample of $Cu(NH_3)_4$(cyhdc) prepared by exposing Cu(cyhdc) to dry gaseous ammonia for 30 minutes were compared to diffraction patterns obtained for samples of Cu(cyhdc) exposed to humid ammonia for various contact times. After just 4 min, an unidentified phase is visible along with dominant reflections for $Cu(NH_3)_4$(cyhdc). Conversion of $Cu(NH_3)_4$(cyhdc) to this unidentified phase, which presumably contains co-adsorbed $H_2O$, is nearly complete after 20 minutes of exposure to humid $NH_3$. The observed reflections were not assignable to $Cu(NH_3)_4$(cyhdc), Cu(cyhdc), or $Cu(NH_3)_2(H_2O)$(cyhdc) materials. Exposure to humid $NH_3$ for 20 minutes clearly resulted in water co-adsorption and distinctive features at 600 $cm^{-1}$ (broad), 1250 $cm^{-1}$, and in the N—H/O—H stretching region at about 3450 $cm^{-1}$).

Infrared spectroscopy data suggest water co-adsorption is minimal under these conditions. Cycling experiments were also performed. A sample of Cu(cyhdc) (~10 mg) was loaded into a TGA pan and placed in a 20 mL vial containing an open 1.8 mL vial loaded with 1 mL of ~28% aqueous ammonia. The larger vial was sealed, and the sample was left undisturbed for 12 minutes, after which it was rapidly transferred to the TGA instrument for analysis (as described above for dry dosing experiments). Under these conditions, the material was stable to several humid $NH_3$ adsorption and desorption cycles.

If Cu(cyhdc) is exposed to humid $NH_3$ for 20 minutes, the powder diffraction pattern of the resulting solid is distinct from that of $Cu(NH_3)_4$(cyhdc), suggesting a new crystalline phase results from the reaction of $H_2O$ vapor with $Cu(NH_3)_4$(cyhdc) in the presence of $NH_3$. This new phase does not form when Cu(cyhdc) is exposed to water vapor or $NH_3$ alone. It was noted that the blue color and powder X-ray diffraction pattern of this phase are distinct from $Cu(NH_3)_2(H_2O)$(cyhdc).

To further probe the co-adsorption of water during humid $NH_3$ exposure, a time-course experiment was performed in which four 5 mg samples of Cu(cyhdc) were placed in open 4 mL vials, heated at 150° C. briefly under dynamic vacuum on a Schlenk line, refilled with $N_2$, quickly capped, and allowed to cool to room temperature. Separately, a 100 mL jar was charged with 10 mL of approximately 28% aqueous $NH_3$, and the atmosphere inside the jar was allowed to equilibrate for 30 min. After this equilibration, the four samples were placed into the jar, which was then quickly sealed. A vial was removed from the jar at pre-determined times (after 4, 8, 12, and 20 min), and a portion of solid from the vial was quickly loaded into a glass capillary under air, and the capillary sealed for analysis by powder x-ray diffraction. The resulting data suggested selectivity for $NH_3$ over $H_2O$ is achieved at short contact times, in spite of a small amount of water co-adsorption.

From the description herein, it will be appreciated that the present disclosure encompasses multiple implementations of the technology which include, but are not limited to, the following:

A material, comprising a porous metal-organic framework M(dicarboxylate), where M=a divalent transition metal ion or alkaline earth metal ion, and (dicarboxylate)=a dicarboxylate linker with a layered two-dimensional structure with paddlewheel-type metal nodes forming a three-dimensional structure with rhombic channels along a c axis.

The material of any previous or following implementation, wherein the metal M of the porous metal-organic framework is selected from the group consisting of Cu, Fe, Cr, Mg, Ca, Mn, Co, Ni, Zn, Mo and Cd.

The material of any previous or following implementation, wherein the porous metal-organic framework is formed with metal ions comprising combinations of two or more metal types distributed throughout the framework in selected ratios.

The material of any previous or following implementation, wherein the dicarboxylate linker comprises trans-1,4-cyclohexanedicarboxylate producing an M(cyhdc) framework.

The material of any previous or following implementation, wherein the dicarboxylate linker comprises 4,4'-biphenyldicarboxylate producing an M(bpdc) framework.

The material of any previous or following implementation, wherein the dicarboxylate linker comprises 1,4-benzenedicarboxylate producing an M(bdc) framework.

The material of any previous or following implementation, wherein the dicarboxylate linker comprises 2,3,5,6-tetrafluoro-1,4-benzenedicarboxylate producing an M(tfbdc) framework.

A method for gas separations, the method comprising: (a) preparing a porous metal organic framework M(dicarboxylate), where M=a divalent transition metal ion or alkaline earth metal ion, and (dicarboxylate)=a dicarboxylate linker; (b) contacting the framework with a stream of an ammonia containing gas or mixture of gases; and (c) adsorbing ammonia molecules from the stream to the porous metal organic framework.

The method of any previous or following implementation, further comprising separating residual gases with reduced ammonia gas concentrations; releasing the adsorbed ammonia molecules from the framework; and collecting the released ammonia molecules.

The method of any previous or following implementation, wherein the metal M of the porous metal-organic framework is selected from the group consisting of Cu, Fe, Cr, Mg, Ca, Mn, Co, Ni, Zn, Mo and Cd.

The method of any previous or following implementation, wherein the dicarboxylate linker of the porous metal-organic framework is selected from the group consisting of trans-1,4-cyclohexanedicarboxylate, 1,4-benzenedicarboxylate, 4,4'-biphenyldicarboxylate, or 2,3,5,6-tetrafluorobenzenedicarboxylate.

The method of any previous or following implementation, the method further comprising removing any water vapor that may be present in the mixture of gases for separation before contacting the framework to the gases.

The method of any previous or following implementation, the method further comprises providing the mixture of gases for separation at temperatures between approximately 273 K and approximately 298 K.

The method of any previous or following implementation, the method further comprising providing the mixture of gases for separation at temperatures between approximately 323 K and approximately 458 K.

The method of any previous or following implementation, the method further comprising providing the mixture of gases for separation at pressures between approximately 0 bar and approximately 6 bar.

The method of any previous or following implementation, the method further comprising providing the mixture of gases for separation at pressures between approximately 200 mbar and approximately 1000 mbar.

The method of any previous or following implementation, wherein the releasing adsorbed ammonia molecules comprises reducing a framework temperature from above 150° C. to below 25° C.

The method of any previous or following implementation, wherein the releasing adsorbed ammonia molecules from the framework further comprises reducing a framework environment pressure to between about 0 bar and about 1.5 bar.

The method of any previous or following implementation, the method further comprises optimizing adsorption temperature and pressure to maximize working capacity; and optimizing desorption temperature and pressure.

An ammonia separation material, comprising a tunable three-dimensional framework configured to reversibly bind ammonia by cooperative insertion into metal-carboxylate bonds to form a dense, coordination polymer, the framework selected from the group of M(cyhdc), M(bpdc), M(bdc) and M(tfbdc), where M is one or more metals selected from the group of M=Cu, Fe, Cr, Mg, Ca, Mn, Co, Ni, Zn, Mo or Cd.

As used herein, the term "implementation" is intended to include, without limitation, embodiments, examples, or other forms of practicing the technology described herein.

As used herein, the singular terms "a," "an," and "the" may include plural referents unless the context clearly dictates otherwise. Reference to an object in the singular is not intended to mean "one and only one" unless explicitly so stated, but rather "one or more."

Phrasing constructs, such as "A, B and/or C", within the present disclosure describe where either A, B, or C can be present, or any combination of items A, B and C. Phrasing constructs indicating, such as "at least one of" followed by listing a group of elements, indicates that at least one of these groups of elements is present, which includes any possible combination of the listed elements as applicable.

References in this disclosure referring to "an embodiment", "at least one embodiment" or similar embodiment wording indicates that a particular feature, structure, or characteristic described in connection with a described embodiment is included in at least one embodiment of the present disclosure. Thus, these various embodiment phrases are not necessarily all referring to the same embodiment, or to a specific embodiment which differs from all the other embodiments being described. The embodiment phrasing should be construed to mean that the particular features, structures, or characteristics of a given embodiment may be combined in any suitable manner in one or more embodiments of the disclosed apparatus, system, or method.

As used herein, the term "set" refers to a collection of one or more objects. Thus, for example, a set of objects can include a single object or multiple objects.

Relational terms such as first and second, top and bottom, upper and lower, left and right, and the like, may be used solely to distinguish one entity or action from another entity or action without necessarily requiring or implying any actual such relationship or order between such entities or actions.

The terms "comprises," "comprising," "has", "having," "includes", "including," "contains", "containing" or any other variation thereof, are intended to cover a non-exclusive inclusion, such that a process, method, article, apparatus, or system, that comprises, has, includes, or contains a list of elements does not include only those elements but may include other elements not expressly listed or inherent to such process, method, article, apparatus, or system. An element proceeded by "comprises . . . a", "has . . . a", "includes . . . a", "contains . . . a" does not, without more constraints, preclude the existence of additional identical elements in the process, method, article, apparatus, or system, that comprises, has, includes, contains the element.

As used herein, the terms "approximately", "approximate", "substantially", "substantial", "essentially", and "about", or any other version thereof, are used to describe and account for small variations. When used in conjunction with an event or circumstance, the terms can refer to instances in which the event or circumstance occurs precisely as well as instances in which the event or circumstance occurs to a close approximation. When used in conjunction with a numerical value, the terms can refer to a range of variation of less than or equal to ±10% of that numerical value, such as less than or equal to ±5%, less than or equal to ±4%, less than or equal to ±3%, less than or equal to ±2%, less than or equal to ±1%, less than or equal to ±0.5%, less than or equal to ±0.1%, or less than or equal to ±0.05%. For example, "substantially" aligned can refer to a range of angular variation of less than or equal to ±10°, such as less than or equal to ±5°, less than or equal to ±4°, less than or equal to ±3°, less than or equal to ±2°, less than or equal to ±1°, less than or equal to ±0.5°, less than or equal to ±0.1°, or less than or equal to ±0.05°.

Additionally, amounts, ratios, and other numerical values may sometimes be presented herein in a range format. It is to be understood that such range format is used for convenience and brevity and should be understood flexibly to include numerical values explicitly specified as limits of a range, but also to include all individual numerical values or sub-ranges encompassed within that range as if each numerical value and sub-range is explicitly specified. For example, a ratio in the range of about 1 to about 200 should be understood to include the explicitly recited limits of about 1 and about 200, but also to include individual ratios such as about 2, about 3, and about 4, and sub-ranges such as about 10 to about 50, about 20 to about 100, and so forth.

The term "coupled" as used herein is defined as connected, although not necessarily directly and not necessarily mechanically. A device or structure that is "configured" in a certain way is configured in at least that way, but may also be configured in ways that are not listed.

Benefits, advantages, solutions to problems, and any element(s) that may cause any benefit, advantage, or solution to occur or become more pronounced are not to be construed as a critical, required, or essential feature or element of the technology described herein or any or all the claims.

In addition, in the foregoing disclosure various features may be grouped together in various embodiments for the purpose of streamlining the disclosure. This method of disclosure is not to be interpreted as reflecting an intention that the claimed embodiments require more features than are expressly recited in each claim. Inventive subject matter can lie in less than all features of a single disclosed embodiment.

The abstract of the disclosure is provided to allow the reader to quickly ascertain the nature of the technical disclosure. It is submitted with the understanding that it will not be used to interpret or limit the scope or meaning of the claims.

It will be appreciated that the practice of some jurisdictions may require deletion of one or more portions of the disclosure after the application is filed. Accordingly, the reader should consult the application as filed for the original content of the disclosure. Any deletion of content of the disclosure should not be construed as a disclaimer, forfeiture, or dedication to the public of any subject matter of the application as originally filed.

The following claims are hereby incorporated into the disclosure, with each claim standing on its own as a separately claimed subject matter.

Although the description herein contains many details, these should not be construed as limiting the scope of the disclosure, but as merely providing illustrations of some of the presently preferred embodiments. Therefore, it will be appreciated that the scope of the disclosure fully encompasses other embodiments which may become obvious to those skilled in the art.

All structural and functional equivalents to the elements of the disclosed embodiments that are known to those of ordinary skill in the art are expressly incorporated herein by reference and are intended to be encompassed by the present claims. Furthermore, no element, component, or method step in the present disclosure is intended to be dedicated to the public regardless of whether the element, component, or method step is explicitly recited in the claims. No claim element herein is to be construed as a "means plus function" element unless the element is expressly recited using the phrase "means for". No claim element herein is to be construed as a "step plus function" element unless the element is expressly recited using the phrase "step for".

What is claimed is:

1. A material, comprising:

a porous metal-organic framework M (dicarboxylate), where M=a divalent transition metal ion or alkaline earth metal ion, and (dicarboxylate)=a dicarboxylate linker with a layered two-dimensional structure with paddlewheel-type metal nodes forming a three-dimensional structure with rhombic channels along a c axis.

2. The material of claim 1, wherein said metal M of the porous metal-organic framework is selected from the group consisting of Cu, Fe, Cr, Mg, Ca, Mn, Co, Ni, Zn, Mo and Cd.

3. The material of claim 1, wherein said porous metal-organic framework is formed with metal ions comprising combinations of two or more metal types distributed throughout the framework in selected ratios.

4. The material of claim 1, wherein the dicarboxylate linker comprises trans-1,4-cyclohexanedicarboxylate producing an M(cyhdc) framework.

5. The material of claim 1, wherein the dicarboxylate linker comprises 4,4'-biphenyldicarboxylate producing an M(bpdc) framework.

6. The material of claim 1, wherein the dicarboxylate linker comprises 1,4-benzenedicarboxylate producing an M(bdc) framework.

7. The material of claim 1, wherein the dicarboxylate linker comprises 2,3,5,6-tetrafluoro-1,4-benzenedicarboxylate producing an M(tfbdc) framework.

8. A method for gas separations, the method comprising:

(a) preparing a porous metal organic framework M(dicarboxylate), where M=a divalent transition metal ion or alkaline earth metal ion, and (dicarboxylate)=a dicarboxylate linker;

(b) contacting the framework with a stream of an ammonia containing gas or mixture of gases; and (c) adsorbing ammonia molecules from said stream to said porous metal organic framework.

9. The method of claim 8, further comprising:
separating residual gases with reduced ammonia gas concentrations;
releasing the adsorbed ammonia molecules from the framework; and
collecting the released ammonia molecules.

10. The method of claim 8, wherein said metal M of the porous metal-organic framework is selected from the group consisting of Cu, Fe, Cr, Mg, Ca, Mn, Co, Ni, Zn, Mo and Cd.

11. The method of claim 8, wherein said dicarboxylate linker of the porous metal-organic framework is selected from the group consisting of trans-1,4-cyclohexanedicarboxylate, 1,4-benzenedicarboxylate, 4,4'-biphenyldicarboxylate, or 2,3,5,6-tetrafluorobenzenedicarboxylate.

12. The method of claim 8, said method further comprising:
removing any water vapor that may be present in the mixture of gases for separation before contacting the framework to the gases.

13. The method of claim 8, said method further comprising:
providing said mixture of gases for separation at temperatures between approximately 273 K and approximately 298 K.

14. The method of claim 8, said method further comprising:
providing said mixture of gases for separation at temperatures between approximately 323 K and approximately 458 K.

15. The method of claim 8, said method further comprising:
providing said mixture of gases for separation at pressures between approximately 0 bar and approximately 6 bar.

16. The method of claim 8, said method further comprising:
providing said mixture of gases for separation at pressures between approximately 200 mbar and approximately 1000 mbar.

17. The method of claim 9, wherein said releasing adsorbed ammonia molecules comprises:
reducing a framework temperature from above 150° C. to below 25° C.

18. The method of claim 17, wherein said releasing adsorbed ammonia molecules from said framework further comprises:
reducing a framework environment pressure to between about 0 bar and about 1.5 bar.

19. The method of claim 9, said method further comprising:
optimizing adsorption temperature and pressure to maximize working capacity; and
optimizing desorption temperature and pressure.

20. An ammonia separation material, comprising:
a tunable three-dimensional framework configured to reversibly bind ammonia by cooperative insertion into metal-carboxylate bonds to form a dense, coordination polymer, the framework selected from the group of M(cyhdc), M(bpdc), M(bdc) and M(tfbdc), where M is one or more metals selected from the group of M=Cu, Fe, Cr, Mg, Ca, Mn, Co, Ni, Zn, Mo or Cd.

* * * * *